(12) United States Patent
Iijima et al.

(10) Patent No.: US 9,016,847 B1
(45) Date of Patent: Apr. 28, 2015

(54) INKJET INK SET, AND METHOD FOR FORMING IMAGE USING SAME

(71) Applicant: Konica Minolta, Inc., Tokyo (JP)

(72) Inventors: Hirotaka Iijima, Tokyo (JP); Akio Maeda, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/395,363

(22) PCT Filed: Apr. 18, 2013

(86) PCT No.: PCT/JP2013/002629
§ 371 (c)(1),
(2) Date: Oct. 17, 2014

(87) PCT Pub. No.: WO2013/157271
PCT Pub. Date: Oct. 24, 2013

(30) Foreign Application Priority Data

Apr. 18, 2012 (JP) ................. 2012-094857

(51) Int. Cl.
| G01D 11/00 | (2006.01) |
| C09D 11/40 | (2014.01) |
| C09D 133/14 | (2006.01) |
| C09D 163/00 | (2006.01) |

(52) U.S. Cl.
CPC ............. C09D 11/40 (2013.01); C09D 133/14 (2013.01); C09D 163/00 (2013.01)

(58) Field of Classification Search
CPC ....... C09D 11/06; C09D 11/38; B41J 11/002; B41M 5/0011; B41M 5/0047; B41M 5/5209

USPC .................... 347/95, 98, 100, 102
See application file for complete search history.

(56) References Cited

U.S. PATENT DOCUMENTS

| 7,250,078 B2* | 7/2007 | Iijima et al. ................. 106/31.27 |
| 7,517,921 B2* | 4/2009 | Nakamura et al. ............ 523/160 |
| 7,950,795 B2* | 5/2011 | Ishikawa et al. .............. 347/102 |
| 2007/0058020 A1 | 3/2007 | Wetjens et al. |
| 2010/0112232 A1 | 5/2010 | Chretien et al. |
| 2013/0044168 A1 | 2/2013 | Kaga et al. |

FOREIGN PATENT DOCUMENTS

| JP | 2005-178330 A | 7/2005 |
| JP | 2006-181801 A | 7/2006 |
| JP | 2010-106275 A | 5/2010 |
| JP | 2010-173287 A | 8/2010 |
| WO | WO2007/025893 A1 | 3/2007 |
| WO | WO2011/065095 A1 | 6/2011 |

* cited by examiner

*Primary Examiner* — An Do
(74) *Attorney, Agent, or Firm* — Lucas & Mercanti, LLP

(57) ABSTRACT

An inkjet ink set comprising: a color ink including a photocurable compound, a photopolymerization initiator, a gelling agent, and a colorant, the color ink undergoing a sol-gel phase transition depending on the temperature; and a clear ink including a photocurable compound, a photopolymerization initiator, and a gelling agent, the clear ink undergoing a sol-gel phase transition depending on the temperature. The viscosity ($\eta$) (CL) of the clear ink at 25° C. is less than ½ the viscosity ($\eta$) (CO) of the color ink at 25° C., and the viscosity ($\eta$) (CL) of the clear ink is $1 \times 10^3$ mPa·s or greater. Provided is an inkjet ink set by which a printed image offering both high image quality and surface gloss can be formed.

4 Claims, 5 Drawing Sheets

INKJET INK SET, AND METHOD FOR FORMING IMAGE USING SAME

CROSS REFERENCE TO RELATED APPLICATION

This Application is a 371 of PCT/JP2013/002629 filed on Apr. 18, 2013 which, in turn, claimed the priority of Japanese Patent Application No. JP2012-094857 filed on Apr. 18, 2012, both applications are incorporated herein by reference.

TECHNICAL FIELD

The present invention relates to an inkjet ink set and an image forming method using the same.

BACKGROUND ART

From the viewpoint of simple and inexpensive image production, inkjet recording has been used in a variety of printing fields. As the inkjet recording method, there is an UV-curable inkjet method wherein droplets of inkjet ink are landed on a recording medium and then cured by irradiation with ultraviolet rays to form an image. Recently, the UV-curable inkjet method has been attracting attention for its capability of forming images having high rubfastness and adhesiveness even on recording media which lack ink absorbing properties.

However, the image forming methods using the conventional UV-curable inkjet systems have the drawback of poor image quality due to failure to prevent combining of neighboring dots during high-speed recording such as single pass recording using a line recording head or high speed serial recording. As one of methods for preventing combining of neighboring dots, there has been proposed a technique of adding a gelling agent to a UV-curable inkjet ink (see, for example, PTL 1 and PTL 2).

In order to enhance the durability of printed images formed by various printers, there has been proposed a technique of applying an overcoat composition containing a gelling agent to the printed images (PTL 3).

In order to improve the rub resistance of printed images and to prevent set-off between printed articles stacked atop each other, there has also been proposed a technique applying a clear ink capable of sol-gel phase transition to the printed images (PTL 4). In this technique, in order to make uniform the thickness of the clear ink film, a curing step is preceded by a step of heating a recording medium on which the clear ink has been landed, so that the clear ink surface is smoothened.

CITATION LIST

Patent Literature

PTL 1
U.S. Patent Application Publication No. 2007/0058020
PTL 2
International Publication No. WO 2007/025893
PTL 3
Japanese Patent Application Laid-Open No. 2010-106275
PTL 4
International Publication No. WO 2011/065095

SUMMARY OF INVENTION

Technical Problem

In general, when an ink has a high leveling property, ink droplets landed on a recording medium are likely to be combined. On the other hand, when combining of ink droplets is prevented, the ink is likely to have a low leveling property. Therefore, while the inkjet inks containing a gelling agent as described in PTL 1 and PTL 2 can prevent combining of neighboring dots, they tend to produce fine irregularities on the surface of a formed image and therefore cannot impart sufficient glossiness to the printed image. Inks such as those disclosed in PTL 1 and PTL 2 also suffer from a limitation that they are likely to cause a level difference in the surface of a formed image depending on the color density of the image.

The present invention has been made in view of the foregoing drawbacks pertinent in the art, and it is an object of the present invention to provide an inkjet ink set capable of forming a printed image having both high image quality and surface glossiness.

Solution to Problem

A first aspect of the present invention relates to inkjet inks set forth below.

[1] An inkjet ink set including: a color ink that undergoes temperature-induced sol-gel phase transition, the color ink including a photocurable compound, a photopolymerization initiator, a gelling agent, and a colorant; and a clear ink that undergoes temperature-induced sol-gel phase transition, the clear ink including a photocurable compound, a photopolymerization initiator, and a gelling agent, in which a viscosity $\eta$ (CL) of the clear ink at 25° C. is less than ½ of a viscosity $\eta$ (CO) of the color ink at 25° C., and the viscosity $\eta$ (CL) of the clear ink is $1 \times 10^3$ mPa·s or more.

[2] The inkjet ink set according to [1], in which the viscosity $\eta$ (CO) of the color ink at 25° C. is higher than $2 \times 10^3$ mPa·s and $5 \times 10^4$ mPa·s or less.

[3] The inkjet ink set according to [1], in which an amount of the gelling agent contained in the clear ink is smaller than that of the gelling agent contained in the color ink.

A second aspect of the present invention relates to an image forming method set forth below.

[4] An image forming method including: attaching droplets of the color ink in the inkjet ink set according to [1] to a recording medium by discharging the droplets from an inkjet recording head; attaching droplets of the clear ink in the inkjet ink set to the recording medium by discharging the droplets from an inkjet recording head; and curing the droplets of the color ink and the droplets of the clear ink landed on the recording medium by irradiating the droplets with actinic radiation.

Advantageous Effects of Invention

The color ink in the inkjet ink set according to one aspect of the present invention rarely causes combining of ink droplets after it is landed on a recording medium. Therefore, a high-resolution image can be formed. On the other hand, the clear ink in the inkjet ink set according to one aspect of the present invention can be easily levelled. Therefore, a highly glossy film can be formed. Specifically, the inkjet ink set according to one aspect of the present invention can form a printed image having both high image quality and glossiness.

DESCRIPTION OF EMBODIMENTS

1. Inkjet Ink Set

Figure 1A:
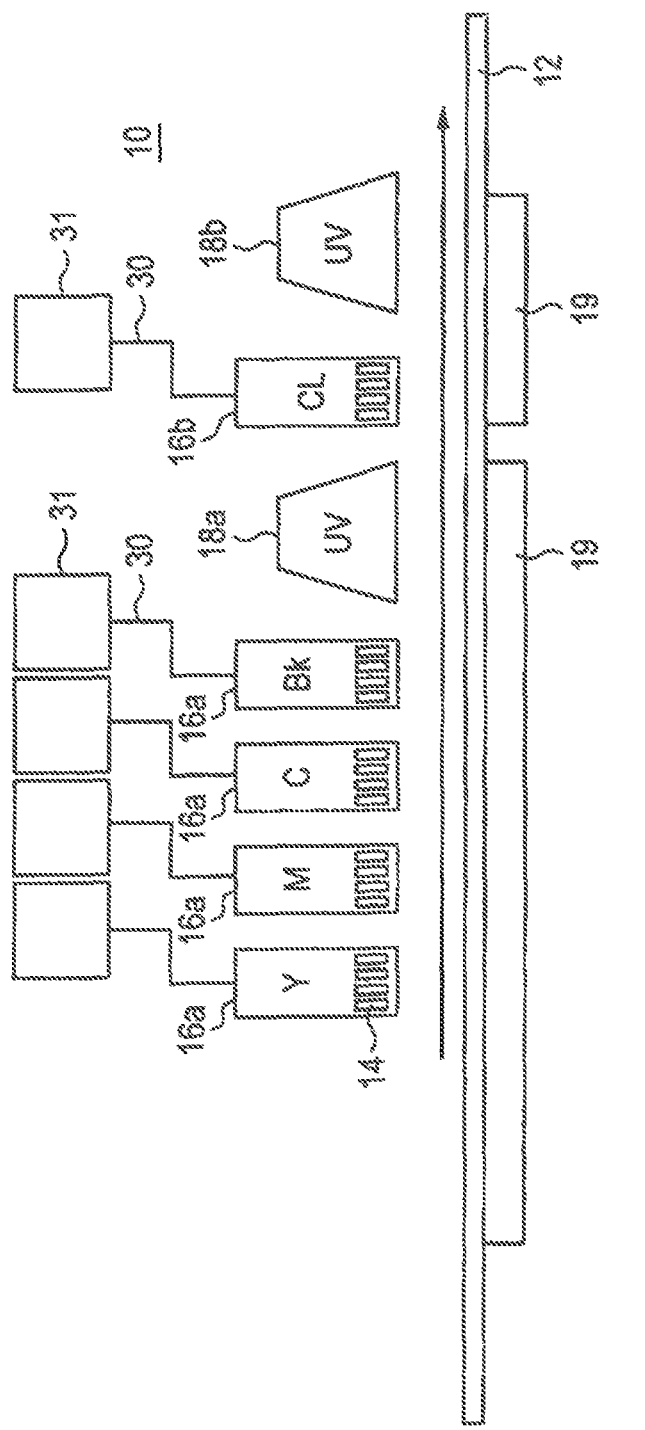
FIG. 1A illustrates one example of the configuration of the main part of inkjet recording apparatus of line recording type (side view)

The inkjet ink set according to one aspect of the present invention contains a color ink and a clear ink. The color ink may come in a single color ink or a color ink set comprising a plurality of color inks (e.g., cyan, magenta, yellow, and black inks).

Color Ink

The color ink is an ink that undergoes temperature-induced sol-gel phase transition.

The color ink contains a photocurable compound, a photopolymerization initiator, a gelling agent, and a colorant and, if necessary, contains additional additives.

(Photocurable Compound)

The photocurable compound refers to a compound which undergoes crosslinking or polymerization by irradiation with actinic radiation. Examples of actinic radiation include electron beams, ultraviolet rays, α rays, γ rays, and X rays. Ultraviolet rays are preferable. The photocurable compound may be a radial polymerizable compound or a cationic polymerizable compound. A radical polymerizable compound is preferable.

The radical polymerizable compound is a compound (monomer, oligomer, polymer or mixture of these) which has an ethylenically unsaturated bond, which is radically polymerizable. In a color ink, either single or two or more types of the radical polymerizable compound may be contained.

Examples of the compound having an ethylenically unsaturated bond, which is radically polymerizable, include an unsaturated carboxylic acid and a salt thereof, an unsaturated carboxylic ester compound, an unsaturated carboxylic urethane compound, an unsaturated carboxylic amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among the foregoing, the radical polymerizable compound is preferably an unsaturated carboxylic ester compound and more preferably a (meth)acrylate compound. The (meth)acrylate compound described later may, in addition to a monomer, be an oligomer, a mixture of a monomer and an oligomer, a modified product, or an oligomer having a polymerizable functional group. The term "(meth)acrylate" indicates both or one of "acrylate" and "methacrylate" and the term "(meth)acryl" indicates both or one of "acryl" and "methacryl".

Examples of the (meth)acrylate compound include monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxy ethyl hexahydrophthalate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxy ethyl succinate, 2-(meth)acryloyloxy ethyl phthalate, 2-(meth)acryloyloxyethyl-2-hydroxyethyl-phthalate, and t-butylcyclohexyl (meth)acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, di(meth)acrylate of a PO adduct of bisphenol A, hydroxy pivalic acid neopentyl glycol di(meth)acrylate, and polytetramethylene glycol di(meth)acrylate; and trifunctional or higher functional monomers such as trimethylolpropane tri(meth)acrylate, pentacrythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate.

Among them, stearyl (meth)acrylate, lauryl (meth)acrylate, isostearyl (meth)acrylate, ethoxy diethylene glycol (meth)acrylate, isobornyl (meth)acrylate, tetraethylene glycol di(meth)acrylate, and glycerin propoxy tri(meth)acrylate are preferable from the viewpoint of photosensitivity, etc.

The (meth)acrylate compound may be a modified product. Examples thereof include ethylene oxide modified (meth)acrylate compounds such as ethylene oxide modified trimethylolpropane tri(meth)acrylate and ethylene oxide modified pentaerythritol tetraacrylate; caprolactone modified (meth)acrylate compounds such as caprolactone modified trimethylolpropane tri(meth)acrylate; and caprolactam modified (meth)acrylate compounds such as caprolactam modified dipentacrythritol hexa(meth)acrylate. Among them, an ethylene oxide modified (meth)acrylate compound is preferable from the viewpoint of high photosensitivity, and easy formation of a card house structure mentioned later during gelling at a low temperature. In addition, since the ethylene oxide modified (meth)acrylate compound is soluble in other ink components at a high temperature and low shrinks at curing, the printed matter is less likely to be curled.

Examples of the ethylene oxide modified (meth)acrylate compound include 4EO modified hexanediol diacrylate CD561 (molecular weight: 358), 3EO modified trimethylolpropane triacrylate SR454 (molecular weight: 429), 6EO modified trimethylolpropane triacrylate SR499 (molecular weight: 560), and 4EO modified pentaerythritol tetraacrylate SR494 (molecular weight: 528) all manufactured by Sartomer Company; polyethylene glycol diacrylate NK ester A-400 (molecular weight: 508), polyethylene glycol diacrylate NK ester A-600 (molecular weight: 742), polyethylene glycol dimethacrylate NK ester 9G (molecular weight: 536), and polyethylene glycol dimethacrylate NK ester 14G (molecular weight: 770) all manufactured by Shin-Nakamura Chemical Co., Ltd.; tetraethylene glycol diacrylate V#335HP (molecular weight: 302) manufactured by OSAKA ORGANIC CHEMICAL INDUSTRY LTD.; 3PO modified trimethylolpropane triacrylate Photomer 4072 (molecular weight: 471) manufactured by Cognis; and 1,10-decanediol dimethacrylate NK ester DOD-N (molecular weight: 310), tricyclodecanedimethanol diacrylate NK ester A-DCP (molecular weight: 304), and tricyclodecanedimethanol dimethacrylate NK ester DCP (molecular weight: 332) all manufactured by Shin-Nakamura Chemical Co., Ltd.

The (meth)acrylate compound may be a polymerizable oligomer. Examples of such a polymerizable oligomer include epoxy (meth)acrylale oligomers, aliphatic urethane (meth)acrylate oligomers, aromatic urethane (meth)acrylate oligomers, polyester (meth)acrylate oligomers, and straight-chain (meth)acrylic oligomers.

On the other hand, the cationic polymerizable compound can be an epoxy compound, a vinyl ether compound, and an oxetane compound. These cationic polymerizable compounds may be contained in the color ink either singly or in combination.

The epoxy compound is aromatic epoxide, alicyclic epoxide, and aliphatic epoxide. Aromatic epoxide and alicyclic epoxide are preferable in view of enhancing curability.

The aromatic epoxide can be di- or polyglycidyl ether, which a obtained by reacting polyhydric phenol or an alkylene oxide adduct thereof with epichlorohydrin. Examples of the polyhydric phenol or the alkylene oxide adduct thereof to be reacted include bisphenol A and alkylene oxide adducts thereof. The alkylene oxide in the alkylene oxide adduct can be ethylene oxide, and propylene oxide.

The alicyclic epoxide can be a cycloalkane oxide-containing compound, which is obtained by epoxidizing a cycloalkane-containing compound with an oxidizing agent such as hydrogen peroxide or peracid. The cycloalkane in the cycloalkane oxide-containing compound can be cyclohexane or cyclopenlene.

The aliphatic epoxide can be di- or polyglycidyl ether, which is obtained by reading an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct can be ethylene oxide and propylene oxide.

Examples of the vinyl ether compound include monovinyl ether compounds such as ethylvinyl ether, n-butylvinyl ether, isobutylvinyl ether, octadecylvinyl ether, cyclohexylvinyl ether, hydroxybutylvinyl ether, 2-ethylhexylvinyl ether, cyclohexane dimethanol monovinyl ether, n-propylvinyl ether, isopropylvinyl ether, isopropenyl ether-o-propylene carbonate, dodecylvinyl ether, diethylene glycol monovinyl ether, and octdecylvinyl ether; and di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether. Of these vinyl ether compounds, di- or trivinyl ether compounds are preferable in light of curability and adhesion.

The oxctane compound refers to a compound having an oxetane ring. Examples thereof include oxctane compounds described in Japanese Patent Application Laid-Open Nos. 2001-220526, 2001-310937, and 2005-255821. Specific examples thereof include a compound represented by Formula (1) described in the paragraph [0089] of Japanese Patent Application Laid-Open No. 2005-255821, a compound represented by Formula (2) described in the paragraph [0092] thereof, a compound represented by Formula (7) described in the paragraph [0107] thereof, a compound represented by Formula (8) described in die paragraph [0109] thereof, and a compound represented by Formula (9) described in the paragraph [0116] thereof. Formulas (1), (2), and (7) to (9) described in Japanese Patent Application Laid-Open No. 2005-255821 are shown below.

[Formula 1]

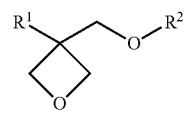

General formula (1)

[Formula 2]

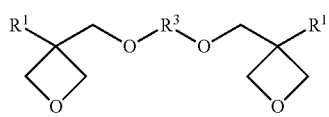

General formula (2)

[Formula 3]

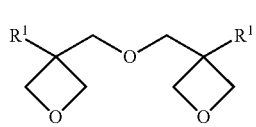

General formula (7)

[Formula 4]

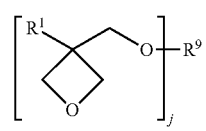

General formula (8)

[Formula 5]

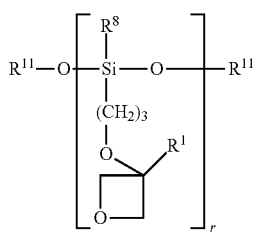

General formula (9)

The content of the photocurable compound is preferably from 1 to 97 wt %, and more preferably from 30 to 95 wt % relative to the total weight of the color ink. If the amount of the photocurable compound is excessively small, the colorant cannot be sufficiently dispersed so that ability of ink discharge from the inkjet recording apparatus is lowered. On the other hand, if the amount of the photocurable compound is an excess, the amount of the gelling agent or the photopolymerization initiator is relatively decreased, resulting in the possibility that sol-gel phase transition does not sufficiently occur or curing is insufficient (Photopolymerization Initiator)

The color ink further contains a photopolymerization initiator.

The photopolymerization initiator includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholinio phenyl)-butanone; benzoins such as benzoin, benzoin methyl ether and benzoin isopropyl ether, acyl phosphine oxides such as 2,4,6-trimethyl benzoin diphenyl phosphine oxide; benzil, and methylphenyl glyoxy ester.

Examples of the intramolecular hydrogen withdrawing type photopolymerization initiator include benzophenones such as benzophenone, o-benzoyl benzoic acid methyl-4-phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl) benzophenone; and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenon, 10-butyl-2-chloro acridone, 2-ethyl anthraquinone, 9,10-phenanthrene quinone, camphor quinone, and triaryl phosphonium salt.

When the photopolymerization initiator is acylphosphine oxide or acyl phosphonate, sensitivity is satisfactory. Specific examples of the preferred photopolymerization initiator include bis(2,4,6-trimethylbenzoyl)-phenylphosphine oxide and bis(2,6-dimethoxybenzoyl)-2,4,4-trimethyl-pentylphosphine oxide.

The content of the photopolymerization initiator contained in the color ink may vary depending on light for irradiation during ink curing, and the type of the photocurable compound. It is preferably from 0.1 wt % to 10 wt %, and more preferably from 2 to 8 wt % relative to the total weight of the ink.

The photopolymerization initiator contained in the color ink may contain a photoacid generating agent. Examples of the photoacid generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

If necessary, the color ink may further contain a photopolymerization initiator auxiliary agent, a polymerization inhibitor, or the like. The photopolymerization initiator auxiliary agent may be a tertiary amine compound and is preferably an aromatic tertiary amine compound. Examples of the aromatic tertiary amine compound include N,N-dimethylaniline, N,N-diethylamline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine. Among them, N,N-dimethylamino-p-benzoic acid ethyl ester and N,N-dimethylamino-p-benzoic acid isoamyl ethyl ester are preferable. These compounds may be contained in the color ink either singly or in combination.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

(Gelling Agent)

The gelling agent contained in the color ink has a function of causing the color ink to undergo temperature-induced reversible sol-gel phase transition. Such a gelling agent is required to satisfy at least the followings requirements: 1) the gelling agent is dissolved in a photocurable compound or a non-polymerizable resin at a temperature higher than the gelation temperature and 2) the gelling agent is crystallized in the ink at a temperature lower than the gelation temperature.

When the gelling agent is crystallized in an ink, it is preferable that a space three-dimensionally surrounded by plate-like crystals, a crystallization product of the gelling agent, is formed so that the photocurable compound is included in that space. A structure in which a photocurable compound is included in a space three-dimensionally surrounded by plate-like crystals can be referred to as a "card house structure." Once a card house structure is formed, the liquid photocurable compound can be maintained therein and ink droplets can be pinned. Accordingly, combining of liquid droplets can be prevented. It is preferable that the photocurable compound and the gelling agent dissolving in the ink are compatible with each other to form the card house structure. In contrast to this, if phase separation between the photocurable compound and the gelling agent dissolved in the ink occurs, the card house structure may be difficult to form.

From a viewpoint of stably discharging ink droplets of the color ink from the inkjet recording apparatus, it is required that compatibility between the photocurable compound and the gelling agent should be satisfactory in the ink in sol state (at high temperature). Furthermore, from a viewpoint of stably preventing combining of droplets even at the time of high-speed printing, it is required that, after ink droplets are landed on a recording medium, the gelling agent should be immediately crystallized to from a strong card house structure.

Examples of such a gelling agent include:

aliphatic ketone compounds;

aliphatic ester compounds;

petroleum waxes such as paraffin wax, microcrystalline wax, and petrolatum;

plant-derived waxes such as candelilla wax, camauba wax, rice wax, sumac wax, jojoba oil, solid jojoba wax, and jojoba ester;

animal-derived waxes such as beeswax, lanolin, and spermaceti;

mineral waxes such as montan wax and hydrogenated wax;

hydrogenated castor oil and hydrogenated castor oil derivatives;

modified waxes such as montan wax derivatives, paraffin wax derivatives, microcrystalline wax derivatives, and polyethylene wax derivatives;

higher fatty acids such as behenic acid, arachidic acid, stearic acid, palmitic acid, myristic acid, lauric acid, oleic acid, and erucic acid;

higher alcohols such as stearyl alcohol and behenyl alcohol;

hydroxystearic acids such as 12-hydroxystearic acid;
12-hydroxystearic acid derivatives;
fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE series manufactured by Nippon Kasei Chemical Co., Ltd., ITOWAX series manufactured by Ito Oil Chemicals Co., Ltd., and FATTY AMID series manufactured by Kao Corporation);
N-substituted fatty acid amides such as N-stearyl stearic acid amide, N-oleyl palmitic acid amide;
specialty fatty acid amides such as N,N'-ethylene bisstearylamide, N,N'-ethylene bis-12-hydroxystearylamide, and N,N'-xylylene bisstearylamide;
higher amines such as dodecylamine, tetradecylamine, and octadecylamine;
fatty acid ester compounds such as stearyl stearic acid, oleyl palmitic acid, glycerin fatty acid ester, sorbitan fatty acid ester, propylene glycol fatty acid ester, ethylene glycol fatty acid ester, and polyoxyethylene fatty acid ester (e.g., EMALLEX series manufactured by Nihon Emulsion Co., Ltd., RIKEMAL series manufactured by Riken Vitamin Co., Ltd., and POEM series manufactured by Riken Vitamin Co., Ltd.);
esters of sucrose fatty acids such as sucrose stearic acid and sucrose palmitic acid (e.g., RYOTO Sugar Ester series manufactured by Mitsubishi-Kagaku Foods Corporation);
synthetic waxes such as polyethylene wax and α-olefin-malic anhydride copolymer wax (UNILIN series manufactured by Baker-Petrolite, etc.);
dimeric acids;
dimer diols (PRIPOR series manufactured by CRODA International Plc, etc.);
fatty acid inulins such as inulin stearate;
fatty acid dextrins such as dextrin palmitate and dextrin myristate (RHEOPEARL series manufactured by Chiba Flour Milling Co., Ltd., etc.);
glyceryl behenate/eicosanedioate;
polyglyceryl behenate/eicosanedioate (NOMCORT series manufactured by Nisshin Oillio Group, Ltd., etc.);
amide compounds such as N-lauroyl-L-glutamic acid dibutylamide and N-(2-ethylhexanoyl)-L-glutamic acid dibutylamide (available from Ajinomoto Fine-Techno Co., Inc.);
dibenzylidene sorbitols such as 1,3:2,4-bis-O-benzylidene-D-glucitol (available from New Japan Chemical Co., Ltd. as GELOL D); and
low molecular weight oil gelling agents described in Japanese Patent Application Laid-Open Nos. 2005-126507, 2005-255821, and 2010-111790.

Preferably, the color ink contains a compound containing a straight-chain alkyl group having 12 or more carbon atoms, as the gelling agent. When the gelling agent contains a straight-chain alkyl group having 12 or more carbon atoms, the above-mentioned "card house structure" can be easily formed. The structure of the gelling agent may have a branched chain.

Specific examples of the gelling agent containing a straight-chain alkyl group having 12 or more carbon atoms include aliphatic ketone compounds, aliphatic ester compounds, higher fatty acids, higher alcohols, and fatty acid amides, which contain a straight-chain alkyl group having 12 or more carbon atoms.

It is to be noted that a gelling agent having a polar group such as —OH or —COOH at the terminals of the alkyl chain may have poor stability in the ink in sol state and thus precipitation or phase separation may occur. Moreover, bleedout of the gelling agent from the cured film of the ink may occur slowly over time. In view of such a circumstance, the gelling agent is preferably an aliphatic ketone compound or an aliphatic ester compound. Examples of such a preferable gelling agent include compounds represented by the following Formulas (G1) and (G2):

$$R1\text{—}CO\text{—}R2 \qquad \text{Formula (G1)}$$

$$R3\text{—}COO\text{—}R4 \qquad \text{Formula (G2)}$$

In Formulas (G1) and (G2), R1 to R4 each independently represent a hydrocarbon group having a straight-chain moiety having 12 or more carbon atoms, and R1 to R4 may also have a branched moiety.

In Formula (G1), the hydrocarbon groups represented by R1 and R2 are each independently, preferably, an aliphatic hydrocarbon group containing a straight-chain moiety having 12 or more and 25 or less carbon atoms. If the straight-chain moiety contained in each of the aliphatic hydrocarbon groups represented by R1 and R2 has less than 12 carbon atoms, the resulting compound fails to function as a gelling agent due to the absence of sufficient crystallinity. In addition, sufficient space for enclosing therein the photocurable compound would not be formed in the above-mentioned card house structure. On the other hand, if the straight-chain moiety contained in each of the aliphatic hydrocarbon groups has more than 25 carbon atoms, the resulting compound would not be soluble in the ink unless the discharge temperature of the ink is raised, due to an excessively high melting point.

Examples of the aliphatic ketone compound represented by Formula (G1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of commercially available products of the compound represented by Formula (G1) include 18-Pentatriacontanon (manufactured by Alfa Aeser), Hentriacontan-16-on (manufactured by Alfa Aeser), and KAO Wax T1 (manufactured by Kao Corporation).

These aliphatic ketone compounds may be contained either singly or as a mixture of two or more types in the color ink.

In Formula (G2), the hydrocarbon groups represented by R3 and R4 are not particularly limited and are each independently, preferably, an aliphatic hydrocarbon group containing a straight-chain moiety having 12 or more and 26 or less carbon atoms. If the straight-chain moiety contained in each of the aliphatic hydrocarbon groups represented by R3 and R4 has 12 or more and 26 or less carbon atoms, the resulting compound can form the above-mentioned card house structure and does not have an excessively high melting point while having crystallinity necessary for the gelling agent, similarly to the compound represented by Formula (G1).

Examples of the aliphatic ester compound represented by Formula (2) include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyldodecyl myristate (C13-C20), stearyl oleate (C17-C18), stearyl erucate (C21-

C18), stearyl linoleate (C17-C18), behenyl oleate (C18-C22), myricyl cerotate (C25-C16), stearyl montanate (C27-C18), behenyl montanate (C27-C22), arachidyl linoleate (C17-C20), and palmityl triacontanate (C29-C16).

Examples of commercially available products of the aliphatic ester compound represented by Formula (2) include UNISTAR M-2222SL (manufactured by NOF Corporation), EXCEPARL SS (manufactured by Kao Corporation, melting point: 60° C.), EMALEX CC-18 (manufactured by Nihon Emulsion Co., Ltd.), AMREPS PC (manufactured by Kokyu Alcohol Kogyo Co., Ltd.), EXCEPARL MY-M (manufactured by Kao Corporation), SPERMACETI (manufactured by NOF Corporation), and EMALEX CC-10 (manufactured by Nihon Emulsion Co., Ltd.). Most of these commercially available products are mixtures of two or more types and may therefore be separated and purified, if necessary.

These aliphatic ester compounds may be contained in the color ink either singly or as a mixture of two or more types.

The amount of the gelling agent in the color ink is preferably from 0.5 to 10.0 wt % and more preferably from 1 to 7 wt % relative to the total amount of the color ink. If the content is less than 0.5 wt %, ink droplets cannot undergo gelation (temperature-induced sol-gel phase transition). On the other hand, if the amount of the gelling agent exceeds 10 wt %, the gelling agent is not sufficiently dissolved in the ink so that ability of ink droplet discharge is lowered.

(Colorant)

The color ink further contains a colorant. The colorant can be a dye or a pigment. A pigment is more preferable because it has satisfactory dispersibility in ink constituents and is excellent in weather resistance.

The dye can be an oil soluble dye. Examples of the oil soluble dye include the following various dyes. Examples of magenta dye include MS Magenta VP, MS Magenta HM-1450, HM Magenta HSo-147 (all manufactured by Mitsui-Toatsu Chemicals), AIZEN SOT Red-1, AIZEN SOT Red-2, AIZEN SOT Red-3, AIZEN SOT Pink-1, SPIRON Red GEH SPECIAL (all manufactured by Hodogaya Chemical), RESOLIN Red FB 200%, MACROLEX Red Violet R, MACROLEX ROT5B (all manufactured by of Bayer Japan), KAYASET Red B, KAYASET Red 130, KAYASET Red 802 (all manufactured by Nippon Kayaku), PHLOXIN, ROSE BENGAL, ACID Red (all manufactured by Daiwa Kasei), HSR-31, DIARESIN Red K (all manufactured by Mitsubishi-Kasei), and Oil Red (manufactured by BASF Japan).

Examples of cyan dye include MS Cyan HM-1238, MS Cyan HSo-16, HM Cyan HSo 144, MS Cyan VPG (all manufactured by Mitsui-Toatsu Chemical), AIZEN SOT Blue-4 (manufactured by Hodogaya Chemical Company), RESOLIN BR, Blue BGLN 200%, MACROLEX Blue RR, CERES Blue GN, SIRIUS SUPRA TURQ Blue Z-BGL, SIRIUS SUPRA TURQ Blue FB-LL 330% (all manufactured by Bayer Japan), KAYASET Blue FR, KAYASET Blue N, KAYASET Blue 814, Turq. Blue GL-5 200, Light Blue BGL-5 200 (all manufactured by Nippon Kayaku), DAIWA Blue 7000, Oleosol Fast Blue GL (all manufactured by Daiwa Kasei), DIARESIN Blue P (manufactured by Mitsubishi-Kasei), SUDAN Blue 670, NEOPEN Blue 808, and ZAPON Blue 806 (all manufactured by BASF Japan).

Examples of yellow dye include MS Yellow HSm-41, Yellow KX-7, Yellow EX-27 (Mitsui-Toatsu Chemical), AIZEN SOT Yellow-1, AIZEN SOT Yellow-3, AIZEN SOT Yellow-6 (all manufactured by Hodogaya Chemical), MACROLEX Yellow 6G, MACROLEX FLUOR Yellow 10GN (all manufactured by Bayer Japan), KAYASET Yellow SF-G, KAYASET Yellow 2G, KAYASET Yellow A-G, KAYASET Yellow E-G (all manufactured by Nippon Kayaku), DAIWA Yellow 330HB (manufactured by of Daiwa Kasei), HSY-68 (manufactured by Mitsubishi-Kasei), SUDAN Yellow 146, and NEOPEN Yellow 075 (all manufactured by BASF Japan).

Examples of black dye include MS Black VPC (manufactured by Mitsui-Toatsu Chemical), AIZEN SOT Black-1, AIZEN SOT Black-5 (all manufactured by Hodogaya Chemical), RESORIN Black GSN 200%, RESOLIN Black BS (all manufactured by Bayer Japan), KAYASET A-N (manufactured by Nippon Kayaku), DAIWA Black MSC (manufactured by Daiwa Kasei), HSB-202 (manufactured by Mitsubishi-Kasei), NEPTUNE Black X60, and NEOPEN Black X58 (all manufactured by BASF Japan).

The pigment is not particularly limited and can be, for example, an organic pigment or an inorganic pigment of any of the following numbers described in the color index.

Examples of red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36. Examples of blue or cyan pigment include Pigment Blue 1, 15, 15:1, 15:2, 15:3, 15:4, 15:6, 16, 17-1, 22, 27, 28, 29, 36, and 60. Examples of green pigment include Pigment Green 7, 26, 36, and 50. Examples of yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigment include Pigment Black 7, 28, and 26.

Examples of commercially available products of the pigment include Chromo Fine Yellow 2080, 5900, 5930, AF-1300, and 2700L, Chromo Fine Orange 3700L and 6730, Chromo Fine Scarlet 6750, Chromo Fine Magenta 6880, 6886, 6891N, 6790, and 6887, Chromo Fine Violet RE, Chromo Fine Red 6820 and 6830, Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, Chromo Fine Green 2GN, 2GO, 2G-550D, 5310, 5370, and 6830, Chromo Fine Black A-1103, Seika Fast Yellow 10GH, A-3, 2035, 2054, 2200, 2270, 2300, 2400 (B), 2500, 2600, ZAY-260, 2700(B), and 2770, Seika Fast Red 8040, C405(F), CA120, LR-116, 1531B, 8060R, 1547, ZAW-262, 1537B, GY, 4R-4016, 3820, 3891, and ZA-215, Seika Fast Carmine 6B1476T-7, 1483LT, 3840, and 3870, Seika Fast Bordeaux 10B-430, Seika Light Rose R40, Seika Light Violet B800 and 7805, Seika Fast Maroon 460N, Seika Fast Orange 900 and 2900, Seika Light Blue C718 and A612, and Cyanine Blue 4933M, 4933GN-EP, 4940, and 4973 (all manufactured by Dainichiseika Colour & Chemicals Mfg. Co., Ltd.);

KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, and KET Green 201 (all manufactured by DIC Corporation);

Colortex Yellow 301, 314, 315, 316, P-624, 314, U10GN, U3GN, UNN, UA-414, and U263, Finecol Yellow T-13 and T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, and Colortex Black 702 and U905 (all manufactured by Sanyo Color Works, LTD.);

Lionol Yellow 1405G, and Lionol Blue FG7330, FG7350, FG7400G, FG7405G, ES, and ESP-5 (all manufactured by Toyo Ink Co., Ltd.);

Toner Magenta E02, Permanent Rubin F6B, Toner Yellow HG, Permanent Yellow GG-02, and Hostapeam Blue B2G (all manufactured by Hoechst Industry Ltd.);

Novoperm P-HG, Hostaperm Pink E, and Hostaperm Blue B2G (all manufactured by Clariant (Japan) K.K.); and Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (all manufactured by Mitsubishi Chemical Company).

The average particle size of the pigment is preferably from 0.08 to 0.5 μm. The maximum particle size of the pigment is preferably from 0.3 to 10 μm, and more preferably from 0.3 to 3 μm. By controlling the particle size of the pigment, clogging in the nozzles of the inkjet recording head can be avoided, and ink storage stability, ink transparency, curing sensitivity can be maintained.

The content of the pigment or dye is preferably from 0.1 lo 20 wt %, and more preferably from 0.4 to 10 wt % relative to the total weight of the color ink. If the content of the pigment or dye is excessively low, color exhibition of an image to be obtained is insufficient. On the other hand, if it is excessively high, the ink viscosity is increased to lower the ability of discharge.

Dispersing of the pigment can be performed by using ball mill, sand mill, attritor, roll mill, agitator, HENSCHEL MIXER, colloid mill, ultrasound homogenizer, pearl mill, wet jet mill, or paint shaker, for example. Dispersing of the pigment is preferably performed such that the average particle size of the pigment particles is preferably from 0.08 to 0.5 μm and the maximum particle size is preferably from 0.3 to 10 μm, and more preferably from 0.3 to 3 μm. Dispersing of the pigment is controlled by the selection of the pigment, a dispersant, and a dispersion medium, dispersion conditions, and filtration conditions, etc.

In order to enhance the dispersibility of the pigment, the color ink may further contain a dispersant. Examples of the dispersant include hydroxyl group-containing carboxylic acid esters, salts of long chain polyaminoamides and high molecular weight acid esters, salts of high molecular weight polycarboxylic acids, salts of long chain polyaminoamides and polar acid esters high molecular weight unsaturated acid esters, high molecular weight copolymers, modified polyurethane, modified polyacrylate, anionic surfactants of polyether ester type, naphthalenesulfonic acid-formalin condensate salts, aromatic sulfonic acid-formalin condensate salts, polyoxyethylene alkyl phosphoric acid esters, polyoxyethylene nonyl phenyl ether, and stearylamine acetate. Examples of commercially available products of the dispersant include SOLSPERSE series of Avecia Biotechnology, Inc., and PB series of Ajinomoto Fine-Techno Co., Inc.

If necessary, the color ink may further contain a dispersion promoter. The dispersion promoter can be selected according to the pigment.

The total amount of a dispersant and a dispersion promoter is preferably from 1 to 50 wt % relative to the weight of pigment.

If necessary, the color ink may further contain a dispersion medium for dispersing the pigment. A solvent may be contained as the dispersion medium in the color ink. However, for preventing the solvent from remaining in a formed image, it is preferable that the dispersion medium should be any of the photocurable compounds (in particular, low viscous monomers) as described above.

(Additional Components)

If necessary, the color ink may further contain additional component(s). Additional components can be various additives and other resins. Examples of the additives include surfactants, leveling agents, matting agents, UV absorbers, IR absorbers, antibacterial agents, and basic compounds that serve to increase the storage stability of color ink. Examples of the basic compounds include basic alkali metal compounds, basic alkali earth metal compounds, and basic organic compounds such as amines. Examples of other resins include resins for adjusting the physical properties of a cured film; examples thereof include polyester resins, polyurethane resins, vinyl resins, acrylic resins, rubber resins, and waxes.

(Viscosity of Color Ink)

Because the color ink contains a gelling agent as described above, it undergoes a temperature-induced reversible sol-gel phase transition. Since a color ink which undergoes sol-gel phase transition is a liquid (sol) at high temperatures (e.g., about 80° C.), the ink can be discharged in a sol state from the inkjet recording head. Once the color ink is discharged at a high temperature, ink droplets (dots) are landed on a recording medium and undergo gelation by natural cooling. Accordingly, combining of neighboring dots is prevented and thus mage quality improves.

In order to enhance ability of the color ink droplet discharge, the viscosity of the ink at a high temperature is preferably the same or lower than a predetermined value. Specifically, the viscosity at 80° C. of the color ink is preferably from 3 to 20 mPa·s. In order to prevent combining of neighboring dots, the ink viscosity at room temperature after landing preferably has a certain value or more. Specifically, the viscosity $\eta$ (CO) at 25° C. of color ink is preferably more than $2 \times 10^3$ mPa·s. The viscosity $\eta$ (CO) of the color ink at 25° C. is preferably $5 \times 10^4$ mPa·s or less.

The gelation temperature of the color ink is preferably 40° C. or higher and 70° C. or lower, and more preferably 50° C. or higher and 65° C. or lower. In a case where the discharge temperature is near 80° C., if the gelation temperature of the color ink exceeds 70° C., gelation easily occurs at the time of discharge thus reducing ability of discharge. On the other hand, if the gelation temperature is lower than 40° C., the color ink after landed on a recording medium does not undergo gelation quickly. The gelation temperature is a temperature when fluidity is lowered by gelation of the ink in a sol state in a process of cooling the sol-state ink.

The viscosity at 80° C., the viscosity at 25° C. and gelation temperature of the color ink can be found by measuring a temperature change in dynamic viscoelasticity of the color ink using a rheometer. Specifically, when the color ink is heated to 100° C. and cooled to 20° C. with conditions including shear rate of 11.7 (1/s) and temperature decrease rate of 0.1° C./s, a temperature change curve of the viscosity is obtained. Further, the viscosity at 80° C. and the viscosity at 25° C. can be obtained by reading each of the viscosities at 80° C. and 25° C. in a temperature change curve of the viscosity. The gelation temperature is obtained from a viscosity curve obtained by measurement.

As for the rheometer, stress control type rheometer Physica MCR series manufactured by Anton Paar can be used. The size of the corn plate can be 75 mm and the corn angle can be 1.0°.

(Method for Preparing Color Ink)

The color ink is obtained by mixing the photocurable compound, the gelling agent, the photopolymerization initiator, and the colorant under heating. Preferably, a pigment dispersion containing a colorant (in particular, pigment) dispersed in part of the photocurable compound is prepared and then mixed with other ink components.

The obtained color ink is preferably filtered through a predetermined filter.

Clear Ink

The clear ink is an ink that undergoes sol-gel phase transition. The clear ink is applied over the above-mentioned color ink. The color ink has high viscosity after it is landed on a recording medium. Therefore, the color ink thus landed on a recording medium may not easily level so that fine irregularities are likely to be formed on the surface of an image. This may reduce the glossiness of the formed image.

Moreover, in the case of forming an image with the color ink, the color density of the image is adjusted by the amount of the color ink. Therefore, an image composed of the color ink is likely to vary in its thickness between regions differing in color density. More specifically, level difference is likely to occur in the formed image.

In view of such a circumstance, a low viscous clear ink is stacked on the color ink to smooth out irregularities or level differences in the color ink surface, whereby the glossiness of the printed matter is enhanced. Moreover, the application of the clear ink over the color ink also enhances the rub resistance of the printed matter.

The clear ink contains a photocurable compound, a photopolymerization initiator, and a gelling agent and, if necessary, contains additional components. The photocurable compound, the photopolymerization initiator, and the gelling agent can be the same as those contained in the color ink.

The amount of the photocurable compound contained in the clear ink is preferably from 1 to 97 wt %, and more preferably from 30 to 95 wt % relative to the total weight of the clear ink. If the amount of the photocurable compound contained in the clear ink is small, the strength or rub resistance of the cured film of the clear ink would be lowered. On the other hand, if the amount of the photocurable compound contained in the clear ink is an excess, the amount of the gelling agent or the photocurable compound is relatively decreased. Therefore, there is the possibility that sol-gel phase transition does not sufficiently occur or curing of the ink is insufficient.

The amount of the photopolymerization initiator contained in the clear ink is preferably from 0.1 to 10 wt %, and more preferably from 2 to 8 wt % relative to the total weight of the clear ink. When the amount of the photopolymerization initiator is small, curing of the ink is insufficient.

The amount of the gelling agent contained in the clear ink is preferably smaller than that of the gelling agent contained in the color ink. By rendering the viscosity of the clear ink lower than that of the color ink, the leveling property of the clear ink can be enhanced. The amount of the gelling agent is preferably from 0.5 to 10.0 wt %, and more preferably from 1.0 to 5.0 wt % relative to the total amount of the clear ink. When the amount of the gelling agent is excessively small, droplets of the clear ink cannot undergo gelation (i.e., temperature-induced sol-gel phase transition). On the other hand, when the amount of the gelling agent is excess, the gelling agent cannot be sufficiently dissolved in the ink so that ability of ink droplet discharge is lowered.

Because the clear ink also contains a gelling agent, it undergoes temperature-induced reversible sol-gel phase transition. Since a clear ink which undergoes sol-gel phase transition is a liquid (sol) at high temperatures (e.g., about 80° C.), the ink can be discharged in sol state from the inkjet recording head. Once the ink is discharged at a high temperature, ink droplets (dots) are landed on a recording medium and undergo gelation by natural cooling. Accordingly, the cured film of the clear ink can be formed only in a target region.

In order to enhance ability of clear ink droplet discharge, the viscosity of the ink at a high temperature preferably equals to or is lower than a predetermined value. Specifically, the viscosity of the clear ink at 80° C. is preferably from 3 to 20 mPa·s.

After the clear ink is landed on a recording medium, it is required, as described above, to smooth out irregularities or level differences in the surface of the image composed of the color ink. More specifically, it is required to form smooth surface by sufficient leveling. In view of this, the viscosity of the clear ink at 25° C. is required to be lower than that of the color ink at 25° C. Specifically, the viscosity $\eta$ (CL) of the clear ink at 25° C. is leas than ½, and more preferably less than ⅓ of the viscosity $\eta$ (CO) of the color ink at the same temperature (25° C.). In the case where the color ink is a set of a plurality of color inks, the viscosity $\eta$ (CL) of the clear ink at 25° C. is less than ½ of the viscosity $\eta$ (CO) of all the color inks at 25° C. When the ratio is less than ½, the clear ink is likely to be levelled after it is landed on a recording medium, so that sufficient surface glossiness can be easily obtained. This ratio of the viscosity of the clear ink at 25° C. to the viscosity of the color ink at 25° C. can be achieved, for example, by decreasing the amount of the gelling agent contained in the clear ink compared with the amount of the gelling agent contained in the color ink.

The viscosity $\eta$ (CL) of the clear ink at 25° C. is particularly preferably $5\times10^4$ mPa·s or less, and further preferably $2\times10^4$ mPa·s or less. When the viscosity $\eta$ (CL) of the clear ink at 25° C. is $5\times10^4$ mPa·s or less, the leveling property of the clear ink is sufficient under usual image forming conditions.

On the other hand, in the case where the viscosity of the clear ink landed on a recording medium is excessively low, the ink cannot sufficiently smooth out the irregularities and level differences in color ink surface so that sufficient glossiness is less likely to be obtained. This is because, due to the low viscosity of the clear ink, irregularities or level differences in the surface of the image composed of the color ink directly appear on the surface of the printed image. Also, when the viscosity of the clear ink is excessively low, the clear ink is likely to contaminate the color ink film before curing so that letter quality would be lowered. In view of this, the viscosity $\eta$ (CL) of the clear ink at 25° C. is preferably $1\times10^3$ mPa·s or more, more preferably $2\times10^3$ mPa·s or more, and even more preferably higher than $5\times10^3$ mPa·s.

The gelation temperature of the clear ink is preferably 40° C. or higher and 70° C. or lower, and more preferably 50° C. or higher and 65° C. or lower. In the case where the discharge temperature is near 80° C., if the gelation temperature of the ink exceeds 70° C., gelation easily occurs at the time of discharge, thus reducing ability of discharge. On the other hand, if the gelation temperature is lower than 40° C., the ink after landed on a recording medium does not undergo gelation so that the clear ink may not sufficiently smooth out irregularities or level differences in color ink surface. The gelation temperature is a temperature when fluidity is lowered by gelation of the ink in sol state in a process of cooling the sol-state ink. The difference between the gelation temperature of the clear ink and the gelation temperature of the color ink is preferably within 10° C., and more preferably within 5° C. If the difference between the gelation temperature of the clear ink and the gelation temperature of the color ink is large, the sharpness and glossiness of the image do not easily balance The viscosity of the clear ink at 80° C., the viscosity thereof at 25° C., and the gelation temperature thereof are measured in the same manner as that for the color ink.

The clear ink is obtained by mixing the photocurable compound, the gelling agent, and the photopolymerization initiator under heating. The obtained clear ink is preferably filtered through a predetermined filter.

2. Image Forming Method

The image forming method according to one aspect of the present invention is a method for forming an image by applying the inks of the above-mentioned inkjet ink set to a recording medium.

Specifically, the image forming method includes the following three steps:

(a) a step of attaching droplets of the color ink in the above-mentioned inkjet ink set to a recording medium by discharging the droplets from an inkjet recording head;

(b) a step of attaching droplets of the clear ink of the inkjet ink set to the recording medium by discharging the droplets from an inkjet recording head; and (c) a step of curing the droplets of the color ink and the droplets of the clear ink landed on the recording medium by irradiating the droplets with actinic radiation.

In the image forming method according to one aspect of the present invention, either of the step (a) of attaching the color ink to a recording medium or the step (b) of attaching the clear ink to the recording medium may be performed prior to the other. Even if the step (b) of attaching the clear ink is performed first, the clear ink fills gaps between the droplets of the color ink and enhances the glossiness of the formed image. However, when the step (a) of attaching the color ink is performed first, the glossiness of the formed image is further enhanced.

The (c) curing step may be performed at one time or divided into two times. For example, the step (a) of attaching the color ink to a recording medium, a step (c-1) of curing the droplets of the color ink, the step of (b) attaching the clear ink to the recording medium, and a step (c-2) of curing the droplets of the clear ink, may be performed in the order presented to individually cure the droplets of the color ink and the droplets of the clear ink.

Alternatively, the step (a) of attaching the color ink to a recording medium, the step (b) of attaching the clear ink to the recording medium, and the step (c) of curing the droplets of the clear ink and the color ink, may be performed in the order presented to cure the droplets of the clear ink and the color ink at once. The droplets of the color ink and the clear ink undergo gelation by sol-gel phase transition, and the viscosities of the clear ink and the color ink at 25° C. equal to or are higher than predetermined values. Therefore, the film of the clear ink before curing is less likely to contaminate the film of the color ink before curing. Thus, even if the step (c) is absent between the step (a) and the step (b), a high-quality image can be obtained. In the case of performing the curing step (c) only once, only one exposing source suffices. This is advantageous because a time required for image formation can be shortened.

Step (1)

Droplets of the above-mentioned color ink are discharged from the inkjet recording head portion of the inkjet recording apparatus. In the case where the color ink is a set of a plurality of color inks, the ink of each color is discharged for image formation. To enhance ability of the color ink droplet discharge, the temperature of the inkjet ink inside the inkjet recording head is preferably set such that it is from 10 to 30° C. higher than the gelation temperature of the color ink. When the ink temperature inside the inkjet recording head is lower than (gelation temperature)+10° C., the ink undergoes gelation inside the inkjet recording head or at the surface of the nozzle, and thus ability of ink droplet discharge can be easily lowered. On the other hand, when the ink temperature inside the inkjet recording head is higher than (gelation temperature)+30° C., the ink is at excessively high temperature, and thus the ink components may be deteriorated.

The color ink is heated in the inkjet recording head of the inkjet recording apparatus, in the ink channel connected to the inkjet recording head, or in the ink tank connected to the ink channel.

The amount of liquid per color ink droplet discharged from each nozzle of the inkjet recording head may vary depending on the resolution of an image. It is preferably from 0.5 to 10 pl, and, for forming a high-resolution image, it is more preferably from 0.5 to 4.0 pl. In order to form a high-resolution image with such a liquid amount, droplets of the ink after landing are not combined. More specifically, sufficient sol-gel phase transition of the color ink is necessary. In the above-mentioned color ink, the sol-gel phase transition occurs immediately. Accordingly, it is possible to stably form a high-resolution image even with such a liquid amount.

The droplets of the color ink landed on a recording medium are cooled and quickly undergo gelation by sol-gel phase transition. As a result, the droplets of the color ink can be pinned without excessive wet spread of the droplets. Because the droplets quickly undergo gelation, it is less likely that oxygen enters the droplets. Thus, curing of the photocurable compound is less likely to be inhibited by oxygen.

The recording medium can be either paper or a resin film. Examples of the paper include coated paper for printing and coated paper B for printing. Further, examples of the resin film include a polyethylene terephthalate film, polypropylene film and a vinyl chloride film.

By allowing color ink droplets to be discharged from the input recording head, the color ink droplets are attached onto a recording medium. The temperature when the droplets of the color ink are landed on the recording medium is preferably set such that it is from 10 to 20° C. lower than the gelation temperature of this ink. When the temperature of the recording medium is excessively low, the color ink droplets undergo gelation and pinning too fast. On the other hand, when the temperature of the recording medium is excessively high, it is difficult for the ink droplets to undergo gelation, and therefore neighboring dots of the ink droplets may be mixed with each other. By appropriately adjusting the temperature of the recording medium, it is possible to achieve both a moderate level of leveling that does not allow for mixing among neighboring dots of the ink droplets and appropriate pinning.

The conveyance speed of the recording medium is preferably from 30 to 120 mm/s. As the conveyance speed increases, the image forming speed also increases, and thus desirable. However, when the conveyance speed is excessively high, the image quality is deteriorated or photocuring of color ink droplets (described later) become insufficient.

Step (2)

Droplets of the above-mentioned clear ink are discharged from the inkjet recording head portion of the inkjet recording apparatus. In order to enhance ability of clear ink droplet discharge, the temperature of the inkjet ink inside the inkjet recording head is preferably set such that it is from 10 to 30° C. higher than the gelation temperature of the clear ink. When the ink temperature inside the inkjet recording head is lower than gelation temperature+10° C., the ink undergoes gelation inside the inkjet recording head or at the surface of the nozzle, and thus ability of ink droplet discharge can be easily lowered. On the other hand, when the ink temperature inside the inkjet recording head is higher than gelation temperature+30° C., the clear ink is at excessively high temperature, and thus the clear ink components may be deteriorated.

The amount of liquid per clear ink droplet discharged from each nozzle of the inkjet recording head may vary depending on the viscosity of the clear ink, and it is preferably from 0.5 to 10 pl, and for discharging the clear ink only to a desired region, it is more preferably from 0.5 to 4.0 pl. Even if the clear ink is applied in such an amount, the clear ink can be discharged only to a desired region without excessive wet spread because the clear ink undergoes sol-gel phase transition in the present invention.

The droplets of the clear ink landed on a recording medium are cooled and undergo gelation by sol-gel phase transition. As a result, the droplets of the clear ink can be pinned without being scattered. Because the droplets quickly undergo gelation, it is less likely that oxygen enters the droplets. Thus, curing of the photocurable compound is less likely to be inhibited by oxygen.

The temperature when the clear ink is applied to the recording medium may differ from the temperature when the color ink is discharged dropwise. Usually, these temperatures are set to the same temperatures. For the inkjet ink set according to one aspect of the present invention, even if the temperature when the clear ink is discharged dropwise to the recording medium is the same as the temperature when the color ink is discharged dropwise to the recording medium, the clear ink sufficiently attains leveling.

Step (3)

By irradiating the droplets of the color ink and the droplets of the clear ink landed on a recording medium with light from an LED light source, the photocurable compounds contained in the color ink droplets and the clear ink droplets undergo crosslinking or polymerization to cure the ink droplets. As described above, the droplets of the color ink and the droplets of the clear ink may be cured at once, or the droplets of the color ink and the droplets of the clear ink may be cured individually.

The light to be directed on the color ink droplets and the clear ink droplets attached to a recording medium is preferably ultraviolet rays from LED light source(s). Specific examples thereof include 395 nm, Water Cooled LED manufactured by Phoseon Technology. In the case of individually curing the color ink droplets and the clear ink droplets, these droplets may be irradiated with the same type of light source or with different types of light sources. Examples of a general UV light source include metal halide lamps. Use of an LED light source can prevent melting the droplets of the color ink or the clear ink by radiation heat, i.e., can prevent poor curing at the surface of the cured film of the ink droplets.

An LED light source is installed such that it provides UV ray of from 360 to 410 nm wavelength with peak luminance from 0.5 to 10 W/cm$^2$ and more preferably from 1 to 5 W/cm$^2$ on a surface of the image. The light quantity to be irradiated onto an image is adjusted to be lower than 500 mJ/cm$^2$ in order to limit the irradiation of the ink droplets with radiation heat.

Inkjet Recording Apparatus

The image recording method described above can be carried out by an inkjet recording apparatus of actinic radiation-curable inkjet type. The inkjet recording apparatus of an actinic radiation-curable inkjet type includes line recording type (single pass recording type) and serial recording type. Although it may be suitably selected depending on desired resolution or recording speed, the line recording (single pass recording type) is preferred from the viewpoint of high speed recording.

Figure 1B:
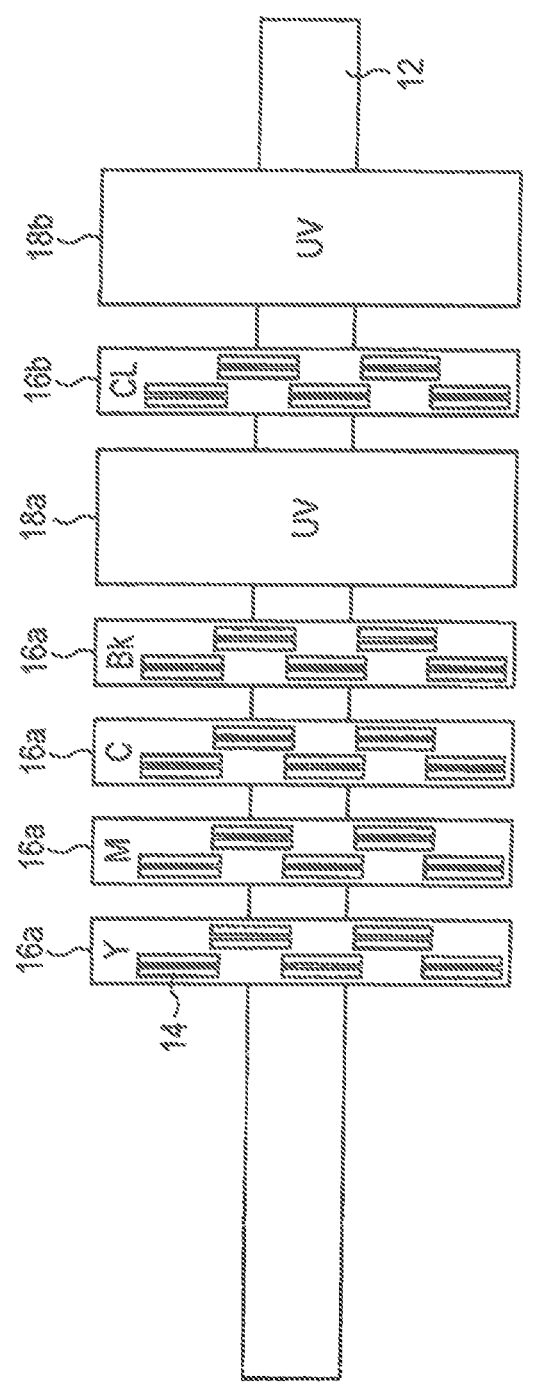
FIG. 1B illustrates one example of the configuration of the main part of an inkjet recording apparatus of line recording type (top view)
Figure 2A:
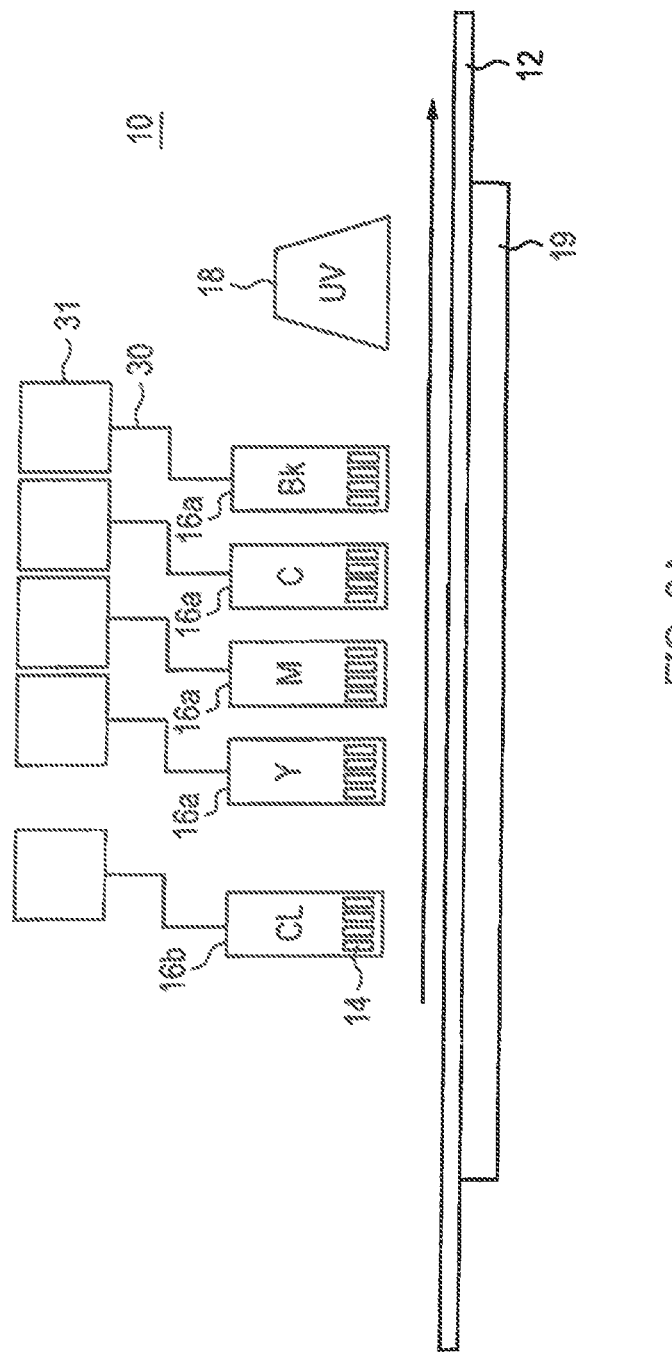
FIG. 2A illustrates another example of the configuration of the main part of an inkjet recording apparatus of line recording type (side view)
Figure 2B:
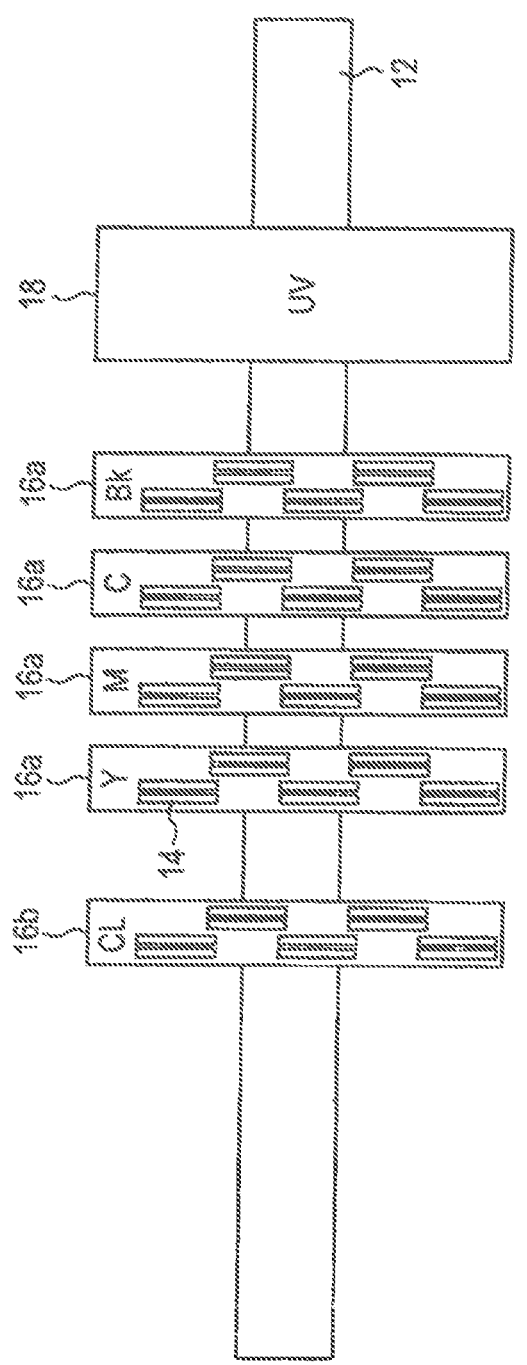
FIG. 2B illustrates another example of the configuration of the main part of an inkjet recording apparatus of line recording type (top view)

FIGS. 1A, 1B, 2A and 2B illustrate examples of the configurations of the main part of inkjet recording apparatuses of line recording type. FIGS. 1A and 2A are side views and FIGS. 1B and 2B are top views. As illustrated in FIGS. 1A, 1B, 2A and 2B inkjet recording apparatus 10 has head carriage 16 (16a and 16b) for accommodating a plurality of inkjet recording head 14, ink channel 30 connected to head carriage 16, ink tank 31 for storing the ink to be fed via ink channel 30, and light irradiation section 18 (18a and 18b) which covers ink tank 31 and the entire width of recording medium 12 and which is arranged at a downstream side of head carriage 16 (conveyance direction of the recording medium), and temperature control section 19 installed on a backside of recording medium 12.

In inkjet recording apparatus 10 illustrated in FIGS. 1A and 1B, head carriage 16a for the color ink, light irradiation section 18a for color ink droplet curing, head carriage 16b for the clear ink, and light irradiation section 18b for clear ink droplet curing are arranged in the order presented. In this apparatus, the droplets of the color ink and the droplets of the clear ink can be cured individually.

On the other hand, in inkjet recording apparatus 10 illustrated in FIGS. 2A and 2B, head carriage 16b for the clear ink, head carriage 16a for the color ink, and light irradiation section 18 are arranged in the order presented. In this apparatus, the clear ink is discharged first to recording medium 12, and the color ink is discharged to this clear ink. The droplets of the color ink and the clear ink are exposed to light at once by light irradiation section 18.

Head carriage 16 in inkjet recording apparatus 10 includes head carriage 16a for the color ink and head carriage 16b for the clear ink. Head carriage 16a for the color ink includes a head carriage for each color. As illustrated in, for example, FIG. 1B, head carriage 16 is fixedly arranged so as to cover the entire width of recording medium 12 and accommodates a plurality of inkjet recording heads 14.

Inkjet recording head 14 is designed to receive color ink or clear ink. For example, an ink can be supplied directly from a non-illustrated ink cartridge or the like that is added in a freely-mountable manner to inkjet recording apparatus 10 or by non-illustrated means for ink supply.

A plurality of inkjet recording heads 14 is installed for each color in the conveyance direction of recording medium 12. The number of inkjet recording heads 14 that is arranged in the conveyance direction of recording medium 12 is determined based on the nozzle density of inkjet recording head 14 and the resolution of a printed image. For example, when an image having the resolution of 1,440×1,440 dpi is formed by using inkjet recording head 14 with a drop volume of 2 pl and a nozzle density of 360 dpi, four of inkjet recording head 14 can be arranged in a staggered manner relative to the conveyance direction of recording medium 12. Further, when an image having the resolution of 720×720 dpi is formed by using inkjet recording head 14 with a drop volume of 6 pl and a nozzle density of 360 dpi, two of inkjet recording head 14 can be arranged in a staggered manner. As described herein, dpi represents the number of liquid droplets (dots) per 2.54 cm.

Ink tank 31 is connected to head carriage 16 via ink channel 30. Ink channel 30 is a passage for supplying an ink in ink tank 31 to head carriage 16. For stable discharge of ink droplets, the ink present in ink tank 31, ink channel 30, head carriage 16, and inkjet recording head 14 is heated to a predetermined temperature to maintain the gel state.

Light irradiation section 18 (18a and 18b) covers the entire width of recording medium 12 and it is arranged at a downstream side of head carriage 16 relative to the conveyance direction of the recording medium. Further, light irradiation section 18 irradiates, with light, the ink liquid droplets which have been discharged from inkjet recording head 14 and landed on the recording medium 12 so as to cure the ink liquid droplets.

Temperature control section 19 is installed on a backside of recording medium 12 and it maintains recording medium 12 at a predetermined temperature. As illustrated for example in FIG. 1A, temperature control section 19 may be divided to portions on the head carriage 16a side for the color ink and on the head carriage 16b side for the clear ink. Temperature control section 19 can be various heaters, for example.

Hereinafter, the image forming method using inkjet recording apparatus 10 of a line recording type is described. In the recording apparatuses of FIGS. 1A and 1B, recording medium 12 is conveyed to a region between head carriage 16a for the color ink of inkjet recording apparatus 10 and temperature control section 19. Meanwhile, recording medium 12 is adjusted to a predetermined temperature by temperature control section 19. Subsequently, the ink droplets at a high temperature are discharged from inkjet recording head 14 of head carriage 16a for color ink and attached to (landed on) recording medium 12. If necessary, the ink droplets of the color ink attached to recording medium 12 are then cured by light irradiation using light irradiation section 18a.

Further, the ink droplets at a high temperature are discharged from inkjet recording head 14 of head carriage 16b for the clear ink and attached to (landed on) recording medium 12. The clear ink droplets attached to recording medium 12 are cured by irradiation with light using light irradiation section 18b.

In the recording apparatuses of FIGS. 2A and 2B, recording medium 12 is conveyed to a region between head carriage 16b for the clear ink of inkjet recording apparatus 10 and temperature control section 19. On the other hand, recording medium 12 is adjusted to a predetermined temperature by temperature control section 19. Subsequently, the ink droplets at a high temperature are discharged from inkjet recording head 14 of head carriage 16b for the clear ink and attached to (landed on) recording medium 12.

Further, recording medium 12 is conveyed to below head carriage 16a for the color ink. The ink droplets at a high temperature are discharged from inkjet recording head 14 and attached to (landed on) recording medium 12. Then, the ink droplets of the clear ink and the color ink attached to recording medium 12 are cured by light irradiation using light irradiation section 18.

The total film thickness of the ink droplet after curing is preferably from 1 to 20 μm. The term "total film thickness of the ink droplet" refers to a maximum value of the film thickness of the cured film of the color ink and the clear ink drawn on a recording medium.

Figure 3:
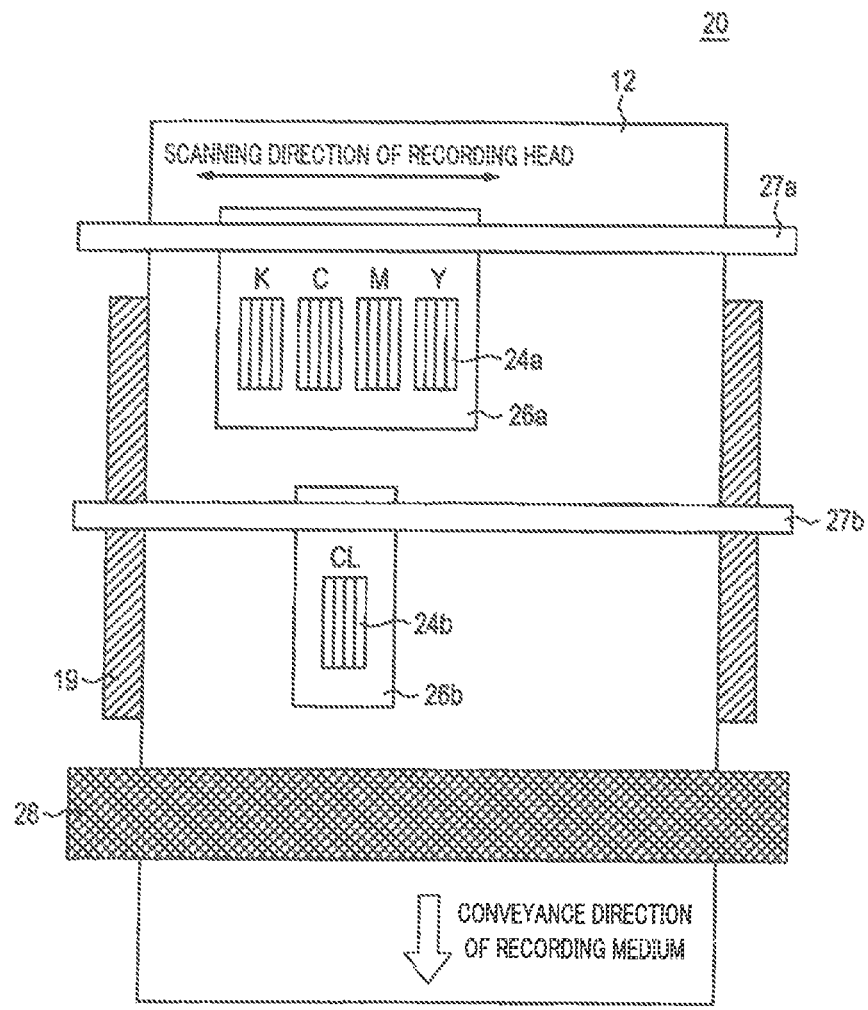
FIG. 3 illustrates an example of the configuration of the main part of an inkjet recording apparatus of serial recording type.

FIG. 3 is a diagram illustrating an example of the configuration of the main part of an inkjet recording apparatus 20 of a serial recording type. As illustrated in FIG. 3, inkjet recording apparatus 20 can be configured in the same manner as that depicted in FIGS. 1A and 1B except that it has head carriage 26 (26a and 26b) which has a width narrower than the entire width of the recording medium and accommodates a plurality of inkjet recording heads 24 instead of head carriage 16 (16a and 16b), and guide section 27 (27a and 27b) for operating head carriage 26 in the width direction of recording medium 12.

In inkjet recording apparatus 20 of serial recording type, head carriage 26 discharges the ink droplets from inkjet recording head 24 accommodated in head carriage 26 while moving along guide section 27 in the width direction of recording medium 12. Once head carriage 26 moves completely in the width direction of recording medium 12 (for each pass), recording medium 12 is delivered in the conveyance direction. Except those operations, the image is recorded in almost the same manner as inkjet recording apparatus 10 of a line recording type that is described above.

In inkjet recording apparatus 20 having the configuration illustrated in FIG. 3, the droplets of the color ink and the clear ink are exposed to light at once by light irradiation section 28. If necessary, a light irradiation section for color ink droplet curing may be disposed between head carriage 26a for the color ink and head carriage 26b for the clear ink.

EXAMPLES

Hereinafter, the present invention will be described in more detailed with reference to Examples, but it is not understood that the scope of the present invention is limited to Examples.

[Radical Polymerizable Inkjet Ink Set (Single Color)]

A radical polymerizable cyan ink and clear ink were prepared using the following components.

Gelling Agent
LUNAC BA (manufactured by Kao Corporation)
FATTY AMID T (manufactured by Kao Corporation)
Stearic acid amide
Kao wax T1 (manufactured by Kao Corporation)
Photocurable Compound (Monomer)
NK eater A-400 (polyethylene glycol #400 diacrylate, manufactured by Shin-Nakamura Chemical Co., Ltd.)
SR494 (4EO modified pentaerythritol tetraacrylate, manufactured by Sartomer Company)
SR499 (6EO modified trimethylolpropane triacrylate, manufactured by Sartomer Company)
Photocurable Compound (Oligomer)
Bifunctional urethane acrylate oligomer (average molecular weight: 1,400)
Photopolymerization Initiator
TPO (phosphine oxide, DAROCURE TPO, manufactured by Chiba Japan Co., Ltd.)
Polymerization Inhibitor
Irgastab UV10 (manufactured by Chiba Japan Co., Ltd.)
Initiator Auxiliary Agent
ITX (isopropyl thioxanthone, Speedcure ITX, manufactured by Lambson)
EDB (amine auxiliary agent, Speedcure EDB, manufacture by Lambson)
Surfactant
KF-352 (polyether modified silicone, manufactured by Shin-Etsu Chemical Company)
(Preparation of Cyan Pigment Dispersion 1)

A pigment dispersant, a polymerizable monomer, and a polymerization inhibitor given below were put into a stainless beaker and heated at 65° C. on a hot plate under stirring for 1 hour.

Pigment dispersant: Ajispet PB824 (manufactured by Ajinormoto Fine-Techno Co., Inc.) 9 pats
Polymerizable monomer: APG-200 (tripropylene glycol diacrylate, manufactured by Shim-Nakamura Chemical Co., Ltd.) 70 parts
Polymerization inhibitor: Irgastab UV10 (manufactured by Chiba Japan Co., Ltd.) 0.02 parts After the resulting mixed solution is cooled to room temperature, 21 parts of cyan pigment 1 described below was added thereto, and put and sealed together with 200 g of zirconia beads having a diameter of 0.5 mm into a glass bottle. After dispersion for 8 hours using a paint shaker, the zirconia beads were removed to prepare cyan pigment dispersion 1.

Cyan pigment 1: Pigment Blue 15:4

<Preparation of Radical Polymerizable Cyan Ink Cy1>

Components were mixed according to the composition ratio given below in Table 1, and stirred under heating at 100° C. While the temperature of the obtained solution was kept, the solution was filtered through a #3000 metal mesh filter. The product thus obtained was cooled to prepare radical polymerizable cyan ink Cy1.

<Preparation of Radical Polymerizable Cyan Inks Cy2 to Cy5>

Radical polymerizable cyan inks Cy2 to Cy5 were prepared in the same manner as that described in Example 1 except that components were mixed according to the composition ratio given below in Table 1.

apparatus (TEK150P/MC1) included in Physica MCR300. Each of the inks was loaded in the measurement apparatus and heated to 100° C. Then, it was cooled to 25° C. at a temperature decrease rate of 0.1° C./s, while the viscosity at a shear rate of 11.7/s was measured. The temperature at which the viscosity exhibited 500 mPa·s was determined from the viscosity curve obtained by the measurement, and used as the gelation temperature. The calculated gelation temperature is shown in Table 1.

Viscosity at 25° C.

The viscosity at 25° C. was measured using the above-mentioned rheometer. The measurement value is shown in Table 1.

TABLE 1

| Radical polymerizable cyan ink | | Cy1 | Cy2 | Cy3 | Cy4 | Cy5 |
|---|---|---|---|---|---|---|
| Pigment dispersion | Cyan pigment dispersion 1 | 15 | 15 | 15 | 15 | 15 |
| Gelling agent | LUNAC BA | | | 5 | | |
| | FATTY AMID T | | | | 5 | |
| | Stearic acid amide | | | | | 7 |
| | Kao Wax T1 | 2.5 | 4 | | | |
| Photocurable compound (monomer) | NK ester A-400 | 32.3 | 30.8 | 29.8 | 29.8 | 27.8 |
| | SR494 | 17 | 17 | 17 | 17 | 17 |
| | SR499 | 21 | 21 | 21 | 21 | 21 |
| Photocurable compound (oligomer) | Urethane acrylate oligomer | 1 | 1 | 1 | 1 | 1 |
| Photopolymerization initiator | TPO | 6 | 6 | 6 | 6 | 6 |
| Initiator auxiliary agemt | ITX | 1 | 1 | 1 | 1 | 1 |
| | EDB | 1 | 1 | 1 | 1 | 1 |
| Polymerization inhibitor | Irgastab UV10 | 0.1 | 0.1 | 0.1 | 0.1 | 0.1 |
| Surfactant | KF-352 | 0.03 | 0.05 | 0 | 0 | 0.05 |
| Gelation temperature (° C.) | | 62 | 63 | 51 | 78 | 66 |
| Viscosity (mPa·s) | | $2.2 \times 10^3$ | $7.2 \times 10^3$ | $9.8 \times 10^3$ | $1.8 \times 10^4$ | $6.1 \times 10^4$ |

<Measurement of Ink Physical Property>

The radical polymerizable cyan inks were measured for gelation temperature and viscosity at 25° C. by methods described below.

Gelation Temperature

A corn plate having a diameter of 75 mm and a corn angle of 1° (CP75-1, manufactured by Anton Paar) was installed in a stress control type rheometer (Physica MCR300, manufactured by Anton Paar) capable of temperature control, followed by viscosity measurement. Temperature control was performed using a Peltier element type temperature control <Preparation of Radical Polymerizable Clear Inks CL1 to CL5>

Components were mixed according to the composition ratio given below in Table 2, and stirred under heating at 100° C. While the temperature of the obtained solution was kept, the solution was filtered through a #3000 metal mesh filter. The product thus obtained was cooled to prepare radical polymerizable clear inks CL1 to CL5. The gelation temperature and the viscosity at 25° C. were measured in the same manner as that for the cyan inks. The results are shown in Table 2.

TABLE 2

| Radical polymerizable cyan ink | | CL1 | CL2 | CL3 | CL4 | CL5 |
|---|---|---|---|---|---|---|
| Gelling agent | LUNAC BA | | | | | 3.5 |
| | Kao Wax T1 | 1 | 1.5 | 2 | 3.2 | |
| Photocurable compound (monomer) | NK ester A-400 | 52.3 | 51.3 | 50.8 | 49.3 | 49.3 |
| | SR494 | 18 | 18 | 18 | 18 | 18 |
| | SR499 | 16 | 16 | 16 | 16 | 16 |
| Photocurable compound (oligomer) | Urethane acrylate oligomer | 2 | 2 | 2 | 2 | 2 |
| Photopolymerization initiator | TPO | 6 | 6 | 6 | 6 | 6 |
| Initiator auxiliary agemt | ITX | 1 | 1 | 1 | 1 | 1 |
| | EDB | 1 | 1 | 1 | 1 | 1 |
| Polymerization inhibitor | Irgastab UV10 | 0.1 | 0.1 | 0.1 | 0.1 | 0.1 |
| Surfactant | KF-352 | 0.05 | 0.05 | 0.06 | 0.15 | 0.35 |
| Gelation temperature (° C.) | | 58 | 60 | 62 | 63 | 51 |
| Viscosity (mPa·s) | | $7.2 \times 10^3$ | $2.1 \times 10^3$ | $3.0 \times 10^3$ | $6.1 \times 10^3$ | $8.7 \times 10^3$ |

Examples 1 to 10 and Comparative Examples 1 to 10

(Formation of Inkjet Image)

Each cyan ink was loaded in head carriage 16a for the cyan ink in an inkjet recording apparatus of line head type equipped with a piezo type inkjet recording head illustrated in FIG. 1A, 1B, 2A or 2B, while each clear ink was loaded in head carriage 16b for the clear ink. Using this apparatus, an image having a single cyan color was formed.

Each ink supplying system of the inkjet recording apparatus was composed of an ink tank, a supply pipe, an anterior ink tank immediately before the recording head, filter-attached piping, and a piezo head. The area from the anterior ink tank to the recording head portion was insulated from heat, while the ink was warmed to gelation temperature+30° C. The ink temperature in the recording head was raised to the above-mentioned temperature by heating using a heater disposed inside the piezo head. The piezo head had a nozzle diameter of 24 μm. As illustrated in FIG. 1B, heads having a nozzle resolution of 600 dpi were arranged in a staggered pattern to form nozzle arrays of 1,200 dpi.

The recording medium performed recording on the following coated paper for printing.

OK TOP COAT+(basis weight: 104.7 g/m$^2$, manufactured by Oji Paper Co., Ltd.)

OK TOP COAT Mat N (basis weight: 104.7 g/m$^2$, manufactured by Oji Paper Co., Ltd.)

OK KINFUJI+(basis weight: 127.9 g/m$^2$, manufactured by Oji Paper Co., Ltd.)

SA KINFUJI+(basis weight: 127.9 g/m$^2$, manufactured by Oji Paper Co., Ltd.)

The recording medium was conveyed while adsorbed on a conveyor. The temperature of this adsorbing conveyor was adjusted such that the surface temperature of the recording medium was kept constant at the time of landing of ink droplets and during UV exposure. The temperature of the recording medium in each of Examples and Comparative Examples is shown in Table 3.

The amount of liquid per cyan ink droplet from the head was set to 3.5 pl. The amount of liquid per clear ink droplet was set to 4 pl. The recording resolution was set to 1,200 dpi×1,200 dpi. The recording speed was set to 800 mm/s. As described herein, dpi represents the number of dots per 2.54 cm. The order in which the cyan ink (Cy) and the clear ink (CL) were used in printing is shown in Table 3.

The cyan ink and the clear ink were each cured by UV exposure. In Examples 1, 2, and 4 to 10 and Comparative Examples 2 to 10, the color ink and the clear ink were both exposed to light at once after being discharged to the recording medium. In Example 3, only the cyan ink was exposed to light immediately after the application of the cyan ink. Then, the clear ink was applied and exposed again to light.

The light exposure was performed using an LED lamp (center emission wavelength: 395 nm, distance between the recording medium and the lamp: 2 mm, maximum output: 7,000 mW/cm$^2$). The image formation described above was performed in an environment of 23° C. and 55% RH.

<Evaluation of Formed Image>

Each formed image was evaluated by the following methods.

(Evaluation of Letter Quality)

Letters of Chinese character 繊 were printed in 5-point and 7-point MS Mincho font in positive and negative (transposed) patterns using each cyan ink. Solid printing at 100% image coverage was performed using each clear ink in regions covering the whole printed letters. The printed letters were visually observed and evaluation was performed according to the following criteria.

S: The details of 5-point letters in both of the negative and positive patterns are reproducible without collapse.

A: 5-point letter in the negative pattern is slightly collapsed but sufficiently legible, and 7-point letters are reproducible without collapse.

B: The detail of 5-point letter in the positive pattern is collapsed but sufficiently legible, and 7-point letters are reproducible without collapse.

C: The detail of 7-point letter in the negative pattern is collapsed.

D: The details of 7-point letters in both of the negative and positive patterns are collapsed.

(Evaluation of Glossiness)

Color density gradation patches with dot ratios changed to 0%, 10%, 20%, 30%, 50%, 70%, and 100% at areas of 2 cm×2 cm were printed using each cyan ink. The obtained images were visually evaluated and the homogeneity of glossiness was evaluated according to the following criteria. The dot ratio refers to the pixel color density of the output data.

Solid printing at 100% image coverage was performed using each clear ink in regions covering the whole gradation patches.

S: Homogeneous glossiness is obtained at all the dot ratios, and there is no discomfort depending on the difference in glossiness even at the boundaries between the gradation patches.

A: Homogeneous glossiness in obtained at all the dot ratios, and the discontinuity of glossiness can be slightly confirmed at the boundaries between the gradation patches.

B: The discontinuity of glossiness is conspicuous at the boundaries between the gradation patches.

C: Areas of concern, such as shiny or matte areas, are present in the glossiness of the gradation patches at some of the dot ratios.

D: Glossiness is not homogeneous due to significantly shiny or matte areas, and the glossiness is a practically intolerable level.

(Evaluation of Relief Feeling)

Natural images (high-resolution color digital standard image data "cafeteria" issued by Japanese Standards Association) were printed as grayscale images using Adobe Photoshop 7.0. Solid printing at 100% image coverage was performed using each clear ink in regions covering the whole images. As described herein, the relief feeling refers to the impression of irregularities attributed to level differences generated at the boundary between portions differing in the color density of the image.

S: A smooth image is formed with absolutely no relief feeling.

A: There is a slight relief feeling, but there is little discomfort as a whole.

B: There are some portions having perceivable irregularities.

D: The whole image has great irregularities and significantly gives a relief feeling, and the relief feeling is a practically intolerable level.

(Evaluation of Rub Resistance)

Solid cyan images of 5 cm×5 cm at 100% image coverage were formed. Solid printing at 100% image coverage was performed using each clear ink in regions covering the whole images. Next, in accordance with the method described in "JIS Standards K5701-1 6.2.3 Rub Resistance Test", recording media cut in a suitable size was placed on the image, a load was applied thereon, and the recording media was rubbed against the image. Thereafter, an extent of decrease in the color density of the image was visually observed and evaluation was performed according to the following criteria.

A: Even though the image is rubbed 100 strokes or more with the paper sheet, absolutely no change is recognized in the image.

B: Decrease in the color density of the image is recognized at the time when the image has been rubbed 100 strokes, but the decrease is a practically acceptable level.

C: Obvious decrease in the color density of the image is recognized at the time when the image has been rubbed fewer than 50 strokes, and the decrease is a practically intolerable level.

satisfactory letter quality and glossiness and were also successfully prevented from having a relief feeling. Furthermore, the rub resistance was also high (Examples 1 to 10).

In contrast to this, in the case where no clear ink was applied (Comparative Example 1), the letter quality was satisfactory but the glossiness and the relief feeling were poorly graded. Furthermore, the rub resistance was also low. This is presumably because fine irregularities, level differences, or the like occurred in the surface of the printed image.

In the case of the image formation conditions of Comparative Examples 6 and 7 where the viscosity of the clear ink was the same as or higher than that of the color ink, the letter quality was satisfactory but the glossiness or the relief feeling was poorly graded. Under these image formation conditions, the droplets of the color ink quickly underwent sol-gel phase transition after the droplets were landed on the recording medium and thus combining of color ink droplets was successfully prevented. On the other hand, presumably, leveling was insufficiently attained due to the high viscosity of the clear ink landed on the recording medium, thus resulting in the occurrence of irregularities or level difference in the image surface.

Likewise, in the case of the image formation conditions of Comparative Examples 3, 5, and 9 where the viscosity of the

TABLE 3

| | Color ink | | Clear ink | | Order in | Light ex-posure | Recording medium | Recording medium temperature | Evaluation | | | |
|---|---|---|---|---|---|---|---|---|---|---|---|---|
| | Ink | Viscosity | Ink | Viscosity | printing | | | | Letter quality | Gloss-iness | Relief feeling | Rub resistance |
| Example 1 | Cy2 | $7.2 \times 10^3$ | CL3 | $3.0 \times 10^3$ | Cy→CL | At once | OK TOP COAT+ | 45° C. | S | S | S | A |
| Example 2 | Cy2 | $7.2 \times 10^2$ | CL3 | $3.0 \times 10^3$ | CL→Cy | At once | OK TOP COAT+ | 45° C. | A | B | A | A |
| Example 3 | Cy2 | $7.2 \times 10^3$ | CL3 | $3.0 \times 10^3$ | Cy→CL | Individually | OK TOP COAT+ | 45° C. | S | B | A | A |
| Example 4 | Cy2 | $7.2 \times 10^3$ | CL3 | $3.0 \times 10^3$ | Cy→CL | At once | OK TOP COAT+ | 20° C. | S | B | B | A |
| Example 5 | Cy3 | $9.8 \times 10^3$ | CL2 | $2.1 \times 10^3$ | Cy→CL | At once | OK TOP COAT+ | 48° C. | S | S | S | A |
| Example 6 | Cy4 | $1.8 \times 10^4$ | CL2 | $2.1 \times 10^3$ | Cy→CL | At once | OK TOP COAT+ | 50° C. | S | S | A | A |
| Example 7 | Cy5 | $6.1 \times 10^4$ | CL3 | $3.0 \times 10^3$ | Cy→CL | At once | OK TOP COAT+ | 50° C. | S | S | A | A |
| Comparative Example 1 | Cy4 | $1.8 \times 10^4$ | Absent | — | — | — | OK TOP COAT+ | 45° C. | A | D | D | C |
| Comparative Exarnrile 2 | Cy2 | $7.2 \times 10^3$ | CL4 | $6.1 \times 10^3$ | Cy→CL | At once | OK TOP COAT+ | 45° C. | A | C | B | A |
| Comparative Example 3 | Cy2 | $7.2 \times 10^3$ | CL5 | $8.7 \times 10^3$ | Cy→CL | At once | OK TOP COAT+ | 55° C. | C | A | A | A |
| Comparative Example 4 | Cy2 | $7.2 \times 10^3$ | CL1 | $72 \times 10^3$ | Cy→CL | At once | OK TOP COAT+ | 45° C. | A | C | B | B |
| Comparative Example 5 | Cy1 | $2.2 \times 10^3$ | CL2 | $2.1 \times 10^3$ | Cy→CL | At once | OK TOP COAT+ | 40° C. | C | B | A | B |
| aimparative Example 6 | Cy1 | $7.2 \times 10^3$ | CL2 | $2.1 \times 10^3$ | Cy→CL | At once | OK TOP COAT+ | 25° C. | A | C | D | A |
| Comparative Example 7 | Cy1 | $2.2 \times 10^3$ | CL3 | $3,0 \times 10^3$ | Cy→CL | At once | OK TOP COAT+ | 40° C. | A | C | B | A |
| Comparative Example 8 | Cy1 | $2.2 \times 10^3$ | CL3 | $3.0 \times 10^3$ | Cy→CL | At once | OK TOP COAT+ | 45° C. | C | B | B | A |
| Comparative Example 9 | Cy1 | $2.2 \times 10^3$ | CL3 | $3.0 \times 10^3$ | Cy→CL | At once | OK TOP COAT+ | 48° C. | D | A | A | A |
| Comparative Example 10 | Cy2 | $7.2 \times 10^3$ | CL1 | $7.2 \times 10^3$ | Cy→CL | At once | OK TOP COAT+ | 25° C. | A | C | D | B |
| Example 8 | Cy2 | $7.2 \times 10^3$ | CL3 | $3.0 \times 10^3$ | Cy→CL | At once | SA KINFUJI+ | 45° C. | S | S | S | A |
| Example 9 | Cy2 | $7.2 \times 10^3$ | CL3 | $3.0 \times 10^3$ | Cy→CL | At once | OK KINFUJI+ | 45° C. | S | S | S | A |
| Example 10 | Cy2 | $7.2 \times 10^3$ | CL3 | $3.0 \times 10^3$ | Cy→CL | At once | OK TOP COAT Mat N | 45° C. | S | S | S | A |

As seen from Table 3 above, in the case where the viscosity of the clear ink was less than ½ of that of the color ink, the images formed under any image formation condition had clear ink was the same as or higher than that of the color ink, the glossiness or the relief feeling was evaluated as being satisfactory but the letter quality was low. Under these image formation conditions, the clear ink landed on the recording medium sufficiently attained leveling and therefore smoothed the image surface. On the other hand, since the viscosity of the color ink was excessively low at the temperature of the recording medium at the time of image formation, the droplets of the color ink landed thereon insufficiently underwent sol-gel phase transition. Therefore, presumably, the droplets of the color ink were combined.

In the case of the image formation condition of Comparative Example 8 where the viscosity of the clear ink was higher than that of the color ink, the letter quality, the glossiness, and the relief feeling were all evaluated as being low. Under the image formation condition of Comparative Example 8, the color ink landed on the recording medium insufficiently underwent sol-gel phase transition so that combining of droplets failed to be prevented. In addition, presumably, leveling was insufficiently attained due to the excessively high viscosity of the clear ink landed on the recording medium.

In Comparative Examples 4 and 10, due to the excessively low viscosity of the clear ink, the clear ink failed to sufficiently smooth out irregularities or level differences in the color ink surface. Therefore, presumably, the glossiness or the relief feeling was poorly graded.

[Cationic Polymerizable Inkjet Ink Set]

Each cationic polymerizable cyan ink and clear ink were prepared using the following components.

Gelling Agent

Kao Wax T1 (manufactured by Kao Corporation)

Photocurable Compound (Monomer)

OXT221 (oxetane 221, manufactured by Toagosei Co., Ltd.)

CELLOXIDE 2021P (alicyclic epoxy, manufactured by Daicel Chemical Industries, Ltd.)

Photocurable Compound (Oligomer)

Epoxy acrylate oligomer (average molecular weight: 1,800)

Photopolymerization Initiator

CPI-100P (50% solution of triaryl sulfonium salt in propylene carbonate, manufactured by San-Apro Ltd.)

Sensitizer

DEA (diethoxyanthracene, manufactured by Kawasaki Kasei Chemicals Ltd.)

Surfactant

X22-4272 (manufactured by Shin-Etsu Chemical Company)

(Preparation of Cyan Pigment Dispersion 2)

A pigment dispersant and a polymerizable monomer given below were put into a stainless beaker and stirred for 1 hour for dissolution under heating at 65° C. on a hot plate.

Pigment dispersant: Ajisper PB824 (manufactured by Ajinomoto Fine-Techno Co., Inc.) 9 parts Polymerizable monomer: OXT221 (oxetane 221, manufactured by Toagosei Co., Ltd.) 70 parts After the resulting mixed solution was cooled to room temperature, cyan pigment 1 described below was added thereto, and put and sealed together with 200 g of zirconia beads having a diameter of 0.5 mm into a glass bottle. After the treatment for dispersion for 8 hours using a paint shaker, the zirconia beads were removed to prepare cyan pigment dispersion 2.

Cyan pigment 1: Pigment Blue 15:4

<Preparation of Cationic Polymerizable Cyan Inks Cy6 and Cy7>

Components listed in Table 4 were mixed and stirred under heating at 100° C. While the temperature of the obtained solution was kept, the solution was filtered through a #3000 metal mesh filler and cooled to prepare cationic polymerizable cyan inks Cy6 and Cy7. The gelation temperature and the viscosity at 25° C. of each of the obtained inks were measured in the same manner as that for the radical polymerizable inks. The results are shown in Table 4.

TABLE 4

| Cationic polymerizable cyan ink | | Cy6 | Cy7 |
|---|---|---|---|
| Pigment disperson | Cyan pigment dispersion 2 | 15 | 15 |
| Gelling agent | Kao Wax T1 | 2.2 | 4 |
| Photocurable compound (monomer) | OXT221 | 40.6 | 38.9 |
| | CELLOXIDE 2021P | 34 | 29 |
| Photocurable compound (oligomer) | Epoxy acrylate oligomer | 1.5 | 1.5 |
| Photopolymerization initiator | CPI-100P | 5 | 5 |
| Sensitizer | DEA | 2 | 2 |
| Surfactant | X22-4272 | 0.03 | 0 |
| Gelation temperature (° C.) | | 53 | 58 |
| Viscosity (mPa. · s) | | $5.4 \times 10^3$ | $2.2 \times 10^4$ |

<Preparation of Cationic Polymerizable Clear Inks CL6 and CL7>

Components were mixed according to the composition ratio given below in Table 5, and stirred under heating at 65° C. While the temperature of the obtained solution was kept, the solution was filtered through a metal mesh filter of #3000 and cooled to prepare cationic polymerizable clear inks CL6 and CL7. The gelation temperature and the viscosity at 25° C. of each of the obtained inks were measured in the same manner as that for the radical polymerizable inks. The results are shown in Table 5.

TABLE 5

| Cationic polymerizable clear ink | | CL6 | CL7 |
|---|---|---|---|
| Gelling agent | Kao Wax T1 | 1.5 | 2 |
| Photocurable monomer | OXT221 | 47.1 | 44.9 |
| | CELLOXIDE 2021P | 43.5 | 38.5 |
| Photocurable oligomer | Epoxy acrylate oligomer | 1.5 | 1.5 |
| Photopolymerization initiator | CPI-100P | 4 | 4 |
| Sensitizer | DEA | 2 | 2 |
| Surfactant | X22-4272 | 0.08 | 0.15 |
| Gelation temperature (° C.) | | 53 | 58 |
| Viscosity (mPa. · s) | | $1.7 \times 10^3$ | $8.8 \times 10^3$ |

Examples 11 and 12 and Comparative Examples 11 and 12

In the same manner as that described in Examples 1 to 10, each of cation curable cyan inks Cy6 and Cy7 and each of cation curable clear inks CL6 and CL7 were loaded in the inkjet apparatus, followed by image formation. Evaluation was performed in the same manner as that for the radical curable inkjet ink sets (single color). The results are shown in Table 6.

TABLE 6

| | Color ink | | Clear ink | | Order in | Light | Recording | Recording medium | Letter | Gloss- | Relief | Rub |
|---|---|---|---|---|---|---|---|---|---|---|---|---|
| | Ink | Viscosity | Ink | Viscosity | printing | exposure | medium | temperature | quality | iness | feeling | resistance |
| Example 11 | Cy7 | $2.2 \times 10^3$ | CL6 | $1.7 \times 10^3$ | Cy→CL | At once | OK KINFUJI+ | 40° C. | S | S | S | A |
| Example 12 | Cy7 | $2.2 \times 10^3$ | CL7 | $8.8 \times 10^3$ | Cy→CL | At once | OK KINFUJI+ | 40° C. | S | S | S | A |
| Comparative Example 11 | Cy6 | $5.4 \times 10^3$ | CL7 | $8.8 \times 10^3$ | Cy→CL | At once | OK KINFUJI+ | 40° C. | C | A | B | A |
| Comparative Example 12 | Cy6 | $5.4 \times 10^3$ | CL7 | $8.8 \times 10^3$ | Cy→CL | At once | OK KINFUJI+ | 25° C. | A | C | C | A |

As seen from Table 6 above, in the case where the viscosity of the clear ink was less than ½ of that of the color ink, the formed images had satisfactory letter quality and glossiness and were also successfully prevented from having a relief feeling (Examples 11 and 12).

In contrast to this, in Comparative Examples 11 and 12 in which the viscosity of the clear ink was higher than that of the color ink, the glossiness was highly graded but the letter quality was low when the ink was landed on the recording medium having a high temperature (Comparative Example 11). On the other hand, the letter quality was satisfactory but the glossiness or the relief feeling was poorly graded when the ink was landed on the recording medium having a low temperature (Comparative Example 12). In these comparative examples, presumably, the clear ink insufficiently attained leveling when the image is formed at a temperature that permitted prevention of combining of color ink droplets, whereas combining of color ink droplets failed to be prevented when the image if formed under a condition that allowed the clear ink to sufficiently attain leveling.

[Radical Polymerizable Inkjet Ink Set (Color)]
(Preparation of Yellow Ink Y1, Magenta Ink M1, and Black Ink Bk1)

Yellow ink Y1, magenta ink M1, and black ink Bk1 were each prepared in the same manner as that for the radical curable cyan inks except that components were mixed according to the composition ratio given below in Table 7. Each pigment dispersion was prepared in the same manner as that for the cyan pigment dispersions except that the cyan pigment was changed to each of the following pigments.

Yellow pigment: Pigment Yellow 150
Magenta pigment: Pigment Violet 19
Black pigment: carbon black

TABLE 7

| Radical polymerizable Color Ink | | Y1 | M1 | Bk1 |
|---|---|---|---|---|
| Pigment disperson | Yellow pigment dispersion | 20 | | |
| | Magenta pigment dispersion | | 18 | |
| | Black pigment dispersion | | | 15 |
| Gelling agent | Kao Wax T1 | 3 | 3 | 3 |
| Photocurable monomer | SR494 | 15 | 16 | 18 |
| | SR499 | 19 | 20 | 21 |
| Photocurable oligomer | Urethane acrylate oligomer | 1 | 1 | 1 |
| Photopolymerization Initiator | TPO | 6 | 6 | 6 |
| auxillary agent | ITX | 1 | 1 | 1 |
| | EDB | 1 | 1 | 1 |
| Polymerization inhibitor | Irgastab UV10 | 0.1 | 0.1 | 0.1 |
| Surfactant | KF-352 | 0.05 | 0.05 | 0.05 |
| Gelation temperature | | 62 | 61 | 63 |
| Viscosity | | $7.4 \times 10^3$ | $4.5 \times 10^3$ | $6.8 \times 10^3$ |

Examples 13 and 14

Images were formed in the same manner as that described in Example 1 except that yellow ink Y1, magenta ink M1, cyan ink Cy2, and black ink Bk1 were used as color inks and clear ink CL2 was used as a clear ink. Evaluation was performed in the same manner as that for the radical curable inkjet ink sets (single color). The results are shown in Table 8.

TABLE 8

| | Color ink | | Clear ink | | Order in | Light ex- | Recording | Recording medium | Letter | Gloss- | Relief | Rub |
|---|---|---|---|---|---|---|---|---|---|---|---|---|
| | Ink | Viscosity | Ink | Viscosity | printing | posure | medium | temperature | quality | iness | feeling | resistance |
| Example 13 | Y1 | $7.4 \times 10^3$ | CL2 | $2.1 \times 10^3$ | Color→CL | At once | OK TOP COAT+ | 45° C. | A | A | A | A |
| | M1 | $4.5 \times 10^3$ | | | | | | | | | | |
| | Cy2 | $7.2 \times 10^3$ | | | | | | | | | | |
| | Bk1 | $6.8 \times 10^3$ | | | | | | | | | | |
| Example 14 | Y1 | $7.4 \times 10^3$ | CL2 | $2.1 \times 10^3$ | Color→CL | At once | SA KINFUJI+ | 45° C. | A | A | A | A |
| | M1 | $4.5 \times 10^3$ | | | | | | | | | | |
| | Cy2 | $7.2 \times 10^3$ | | | | | | | | | | |
| | Bk1 | $6.8 \times 10^3$ | | | | | | | | | | |

As seen from Table 8 above, the ink set in which the viscosity of the clear ink was less than ½ of that of all the color inks was able to form an image with satisfactory letter quality, regardless of the type of the recording medium. Furthermore, this ink set was also excellent in glossiness and relief feeling. Moreover, the rub resistance was also satisfactory.

The present application claims the priority based on prior Japanese patent applications filed by the same applicant, that is, Japanese Patent Application No. 2012-094857 (filing date of Apr. 18, 2012), and the content of those specifications are all incorporated herein by reference as a part of the present invention.

INDUSTRIAL APPLICABILITY

The inkjet ink set according to one aspect of the present invention contains a color ink that rarely causes combining of droplets after discharge and a clear ink that easily attains leveling by droplets after discharge. Accordingly, an image to be formed has satisfactory letter quality and is also excellent in glossiness, while irregularities depending on the color density of the image do not occur. Thus, the present invention is suitable for use in the preparation of various printed matters for which glossiness or smoothness is required.

REFERENCE SIGNS LIST 10, 20 Inkjet recording apparatus
12 Recording medium
14, 24 Inkjet recording head
16, 26 Head carriage
18, 28 Light irradiation section
19 Temperature control section
27 Guide section

The invention claimed is:

1. An inkjet ink set comprising:
    a color ink that undergoes temperature-induced sol-gel phase transition, the color ink comprising a photocurable compound, a photopolymerization initiator, a gelling agent, and a colorant; and
    a clear ink that undergoes temperature-induced sol-gel phase transition, the clear ink comprising a photocurable compound, a photopolymerization initiator, and a gelling agent, wherein
    a viscosity $\eta$ (CL) of the clear ink at 25° C. is less than ½ of a viscosity $\eta$ (CO) of the color ink at 25° C., and
    the viscosity $\eta$ (CL) of the clear ink is $1 \times 10^3$ mPa·s or more.

2. The inkjet ink set according to claim 1, wherein the viscosity $\eta$ (CO) of the color ink at 25° C. is higher than $2 \times 10^3$ mPa·s and $5 \times 10^4$ mPa·s or less.

3. The inkjet ink set according to claim 1, wherein an amount of the gelling agent contained in the clear ink is smaller than that of the gelling agent contained in the color ink.

4. An image forming method comprising:
    attaching droplets of the color ink in the inkjet ink set according to claim 1 to a recording medium by discharging the droplets from an inkjet recording head;
    attaching droplets of the clear ink in the inkjet ink set to the recording medium by discharging the droplets from an inkjet recording head; and
    curing the droplets of the color ink and the droplets of the clear ink landed on the recording medium by irradiating the droplets with actinic radiation.

* * * * *